US012716996B2

(12) United States Patent
Zaleski et al.

(10) Patent No.: US 12,716,996 B2
(45) Date of Patent: Aug. 25, 2026

(54) PHASE CORRECTION BASED ON BASEBAND DELAY

(71) Applicant: Infineon Technologies AG, Neubiberg (DE)

(72) Inventors: Jan Mateusz Zaleski, Linz (AT); Furqan Farooq Fazili, Linz (AT); Stefan Herzinger, Sauerlach (DE); Muhammad Furqan, Linz (AT); Patrick Hoelzl, Amstetten (AT)

(73) Assignee: Infineon Technologies AG, Neubiberg (DE)

( * ) Notice: Subject to any disclaimer, the term of this patent is extended or adjusted under 35 U.S.C. 154(b) by 472 days.

(21) Appl. No.: 18/478,308

(22) Filed: Sep. 29, 2023

(65) Prior Publication Data

US 2025/0110208 A1 Apr. 3, 2025

(51) Int. Cl.
*G01S 7/40* (2006.01)

(52) U.S. Cl.
CPC .............. *G01S 7/4021* (2013.01); *G01S 7/40* (2013.01)

(58) Field of Classification Search
None
See application file for complete search history.

(56) References Cited

U.S. PATENT DOCUMENTS

| | | | | |
|---|---|---|---|---|
| 2021/0072374 | A1* | 3/2021 | Ogasawara | B60R 25/245 |
| 2021/0156983 | A1* | 5/2021 | Kraut | G01S 7/4008 |
| 2022/0196796 | A1* | 6/2022 | Fiore | G01S 13/581 |
| 2023/0016890 | A1 | 1/2023 | Gerstmair et al. | |

* cited by examiner

*Primary Examiner* — William Kelleher
*Assistant Examiner* — Juliana Cross
(74) *Attorney, Agent, or Firm* — Harrity & Harrity, LLP

(57) ABSTRACT

In some implementations, a radar device may determine a corner frequency associated with a first analog baseband processing component in a first receive (RX) channel of a radar device. The radar device may measure a baseband delay associated with the first analog baseband processing component. The radar device may determine a phase response of the first analog baseband processing component based on the corner frequency, the baseband delay, and a phase transfer function model associated with the first analog baseband processing component. The radar device may digitize an analog output signal of the first analog baseband processing component to create a digitized output signal associated with the first RX channel. The radar device may correct the digitized output signal based on the phase response to create a phase corrected output signal associated with the first RX channel.

20 Claims, 12 Drawing Sheets

PHASE CORRECTION BASED ON BASEBAND DELAY

BACKGROUND

Radar devices are used in a number of applications to detect objects, where the detection typically comprises measuring distances, velocities, or angles of arrival associated with detected targets. In particular, in the automotive sector, there is an increasing need for radar devices that are able to be used in, for example, driving assistance systems (e.g., advanced driver assistance systems (ADAS)), such as for example in adaptive cruise control (ACC) or radar cruise control systems. Such systems are able to automatically adjust a speed of a motor vehicle in order to maintain a safe distance from other motor vehicles traveling in front of the motor vehicle (and from other objects and pedestrians). Other example applications of a radar device in the automotive sector include blind spot detection, lane change assist, and the like.

SUMMARY

In some implementations, a method includes determining a corner frequency associated with a first analog baseband processing component in a first receive (RX) channel of a radar device; measuring a baseband delay associated with the first analog baseband processing component; determining a phase response of the first analog baseband processing component based on the corner frequency, the baseband delay, and a phase transfer function model associated with the first analog baseband processing component; digitizing an analog output signal of the first analog baseband processing component to create a digitized output signal associated with the first RX channel; and correcting the digitized output signal based on the phase response to create a phase corrected output signal associated with the first RX channel.

In some implementations, a radar device includes a first RX channel comprising a first analog baseband processing component; a second RX channel comprising a second analog baseband processing component; one or more components to: provide, during a first time window, a reference signal at a first node in the first analog baseband processing component; provide, during the first time window, the reference signal at a second node in the second RX channel; and determine a first baseband delay associated with the first analog baseband processing component based on a difference between a phase of the reference signal at an output of the first RX channel and a phase of the reference signal at an output of the second RX channel.

In some implementations, a method includes providing, during a first time window, a reference signal at a first node in a first analog baseband processing component of a first RX channel of a radar device; providing, during the first time window, the reference signal at a second node in a second RX channel of the radar device, the second RX channel including a second analog baseband processing component; determining a first baseband delay associated with the first analog baseband processing component based on a difference between a phase of the reference signal at an output of the first RX channel and a phase of the reference signal at an output of the second RX channel; determining a first phase response of the first analog baseband processing component based on the first baseband delay; and correcting a digitized output signal of the first RX channel based on the first phase response to create a phase corrected output signal associated with the first RX channel.

DETAILED DESCRIPTION

Figure 1:
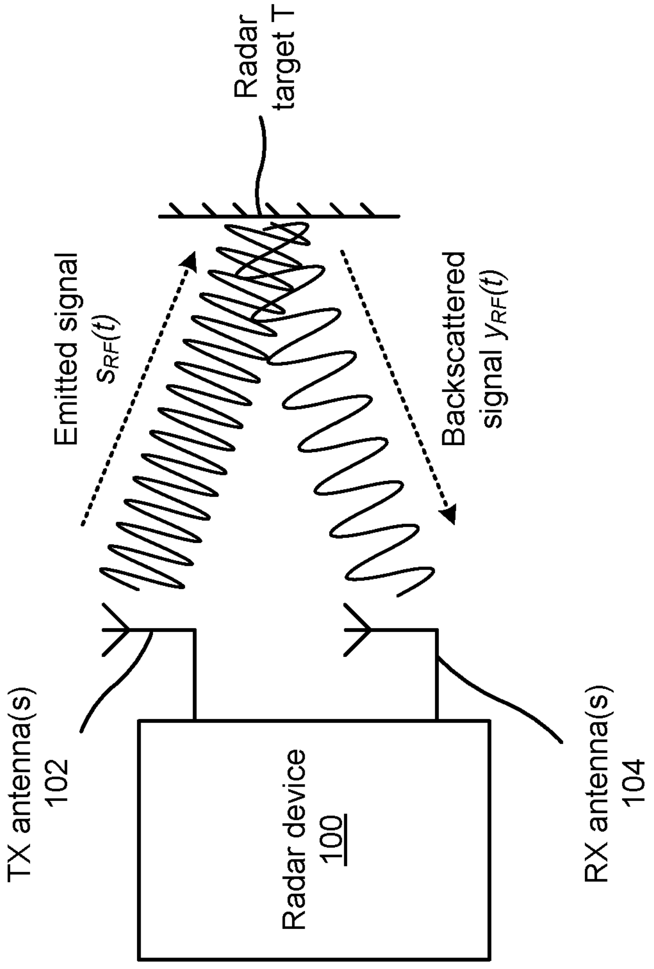
FIG. 1 is a diagram of an example application of a frequency-modulated continuous-wave (FMCW) radar device.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath,"

"lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A radar monolithic microwave integrated circuit (MMIC), sometimes referred to as single radar chip, may incorporate all core functions of a radio frequency (RF) frontend of a radar transceiver (e.g., local oscillator, power amplifiers, low-noise amplifiers (LNAs), mixers, etc.), analog preprocessing of the intermediate frequency (IF) or base band signals (e.g., filters, amplifiers, etc.), and analog-to-digital conversion in one single package. The RF frontend usually includes multiple reception (RX) and transmission (TX) channels, particularly in applications in which beam steering techniques, phased antenna arrays, or the like, are used. In a radar application, phased antenna arrays may be employed to sense an incidence angle of incoming RF radar signals (also referred to as "direction of arrival" or DOA).

In the context of radar MMICs, so-called "cascaded systems" have emerged, whereby multiple MMICs are interconnected to embody a single overall system with increased resolution for radar target discrimination. In a multiple-input multiple-output (MIMO) system, a local oscillator source distributes an RF signal to the transmission and reception channels of each radar MMIC. Additionally, for advanced MIMO and reconfigurable radars it may be useful to have a high number of transmitter outputs on a radar chip, with each transmitter output coupled to a different antenna.

For some applications, the phase relationship between channels, both from an inter-chip and intra-chip perspective, is important. A phase difference between transmission channels can drift or become unbalanced, for example, due to temperature changes. This parameter may be referred to as "phase deviation" or "phase drift," and ensuring low phase deviation can be technically challenging. To reduce or minimize an impact of phase deviation in a cascaded radar system, phase transfer functions of all RX channels across all MMICs need to be aligned. However, such alignment is not practically possible and, therefore, signals of the RX channels are typically post-processed to compensate for the process-dependent phase transfer functions of each RX channel across the cascaded MMICs. Contributors to phase deviation of a given RX channel include RF-related delay, baseband delay, and clock delay. For example, a radar device may be configured to use a range of intermediate frequency (IF) frequencies (e.g., 10 kilohertz (kHz) to 22.5 megahertz (MHz)). A precise tone IF frequency corresponds to the range of a target, and so the baseband delay causes different phase error or DoA error depending on the range.

One prior technique to provide correction of phase deviation caused by baseband delay includes measuring a high pass filter (HPF) corner frequency and an anti-aliasing filter (AAF) corner frequency and then scaling phase transfer function models associated with the HPF and the AAF based on the HPF corner frequency and the AAF corner frequency, respectively. Next, a phase response is determined using the phase transfer function models, and a correction is applied to a digitized output signal based on the phase response. However, because this prior technique uses an indirect measurement of a baseband delay (e.g., a delay attributable to a set of components including the AAF and a transimpedance amplifier (TIA)), which may be the cause of approximately 80% of an overall phase error, there are two contributors that cause some phase deviation to go uncorrected: (1) error caused by a TIA delay spread or other analog baseband component parts, which is not reflected in the AAF corner frequency measurement and (2) error caused by trimming if some (but not all) filter poles are trimmed or if the filter poles are trimmed unequally, which causes the AAF corner frequency to not be well-correlated with the phase transfer function. The prior technique uses semi-direct measurement of an AAF roll-off effect, which may be the cause of approximately 20% of the overall phase error. As a result of these factors, in one example, the prior technique achieves only ±10 degree) (° post-compensation phase error for a 20 megahertz (MHz) IF bandwidth, which may be inadequate for some applications.

Some implementations described herein provide techniques and apparatuses for phase correction based on baseband delay. In some implementations, a radar device may determine a corner frequency associated with a first analog baseband processing component in a first RX channel of the radar device, and may measure a baseband delay associated with the first analog baseband processing component. The radar device may determine a phase response of the first analog baseband processing component based on the corner frequency, the baseband delay, and a phase transfer function model associated with the first analog baseband processing component, and may then digitize an analog output signal of the first analog baseband processing component to create a digitized output signal associated with the first RX channel. The device may then correct the digitized output signal based on the phase response to create a phase corrected output signal associated with the first RX channel.

Notably, the techniques and apparatuses described herein use a direct measurement of the baseband delay and, therefore error cause by a TIA delay spread can be compensated. Further, although the techniques and apparatuses described herein use an indirect measurement of the AAF roll-off effect, meaning that some error caused by AAF corner trimming and measurement accuracy of the baseband delay may be present, such error is negligible and can be accepted in most applications. Overall, with adequate measurement accuracy (e.g., less than approximately ±1.5°), a radar device using the techniques and apparatuses described herein can achieve, for example, ±5° post-compensation phase error, meaning that operation of the radar device is improved (e.g., as compared to a result of using the prior technique).

Furthermore, the techniques and apparatuses described herein enable measurement of a baseband delay. Conventionally, a baseband delay of an RX channel (or of one or more components of the RX channel) of a MMIC is measured using external measurement equipment (i.e., one or more components that are not integrated on the MMIC). However, such a procedure is time-consuming, increases costs, introduces measurement error and, additionally, cannot be extended to monitoring of the baseband delay over a lifecycle of the MMIC.

Some implementations described herein provide techniques and apparatuses for measurement of a baseband delay. In some implementations, a radar device may provide, during a first time window, a reference signal at a first node in a first analog baseband processing component of a first RX channel of the radar device. The radar device may also provide, during the first time window, the reference signal at a second node in a second RX channel of the radar device. The radar device may then determine a first baseband delay associated with the first analog baseband processing component based on a difference between a phase of the reference signal at an output of the first RX channel and a phase of the reference signal at an output of the second RX channel. The determine baseband delay can be used, for example, for phase correction in a digitized output signal (e.g., as described above).

This approach for measurement of the baseband delay is advantageous because a source of the reference signal can be integrated in the MMIC, which enables the reference signal to be provided to different nodes of the different RX channels of the MMIC internally using digital switching logic. Here, no external measurement equipment is needed, which reduces sources of potential measurement error, meaning that measurement accuracy is improved which, in turn, improves accuracy and reliability of phase correction performed by the radar device. Furthermore, the techniques and apparatuses described herein enables monitoring and correction over the lifecycle of the MMIC. Additionally, the techniques and apparatuses described herein for baseband delay measurement can reduce cost, time, and resources required for component verification and testing, which result in a reduction in energy consumption and associated carbon emissions by avoiding unnecessary testing processes.

FIG. 1 is a diagram illustrating an example application of a frequency-modulated continuous-wave (FMCW) radar sensor in the form of a radar device 100 for measuring distances, velocities, or angle of arrivals (AoAs) associated with objects, referred to as targets. As shown in FIG. 1, the radar device 100 may have one or more TX antennas 102 and one or more RX antennas 104. In some implementations, a single antenna may be used that serves simultaneously as a TX antenna 102 and as an RX antenna 104.

In operation, the TX antenna 102 continuously emits an RF signal $s_{RF}(t)$ (also referred to as a transmitted radar signal), which is frequency-modulated, for example, by a periodic linear frequency ramp signal (also referred to as a frequency sweep or chirp signal). The transmitted radar signal $s_{RF}(t)$ is backscattered at a target T and a reflected signal $y_{RF}(t)$ (e.g., a back-scattered signal, an echo signal, a received RF signal, or a received radar signal) is received by the RX antenna 104. FIG. 1 shows a simplified example—in practice, the radar device 100 may include a plurality of TX antennas 102 and RX antennas 104 to be able to determine an AoA of the received RF signal $y_{RF}(t)$ and, therefore, locate the target T with increased accuracy as compared to a radar device that may use a single TX antenna and/or a signal RX antenna.

As used herein, "(t)" denotes an analog signal defined as a continuous-time signal that may change over a time period t, and "[n]" denotes a digital signal defined as a discrete-time signal, where n is an integer and may represent an nth sample or a signal containing n samples. A signal may be represented with or without its continuous-time or discrete-time domain identifier (t) and [n], respectively. It will be appreciated that RF circuits, such as the radar device 100, may be used in fields other than radar. For example, RF circuits may be used in RF communication systems. Accordingly, in some implementations, the radar device 100 may be used in an RF application other than radar, such as RF communication.

As indicated above, FIG. 1 is provided as an example. Other examples may differ from what is described with regard to FIG. 1.

Figure 2:
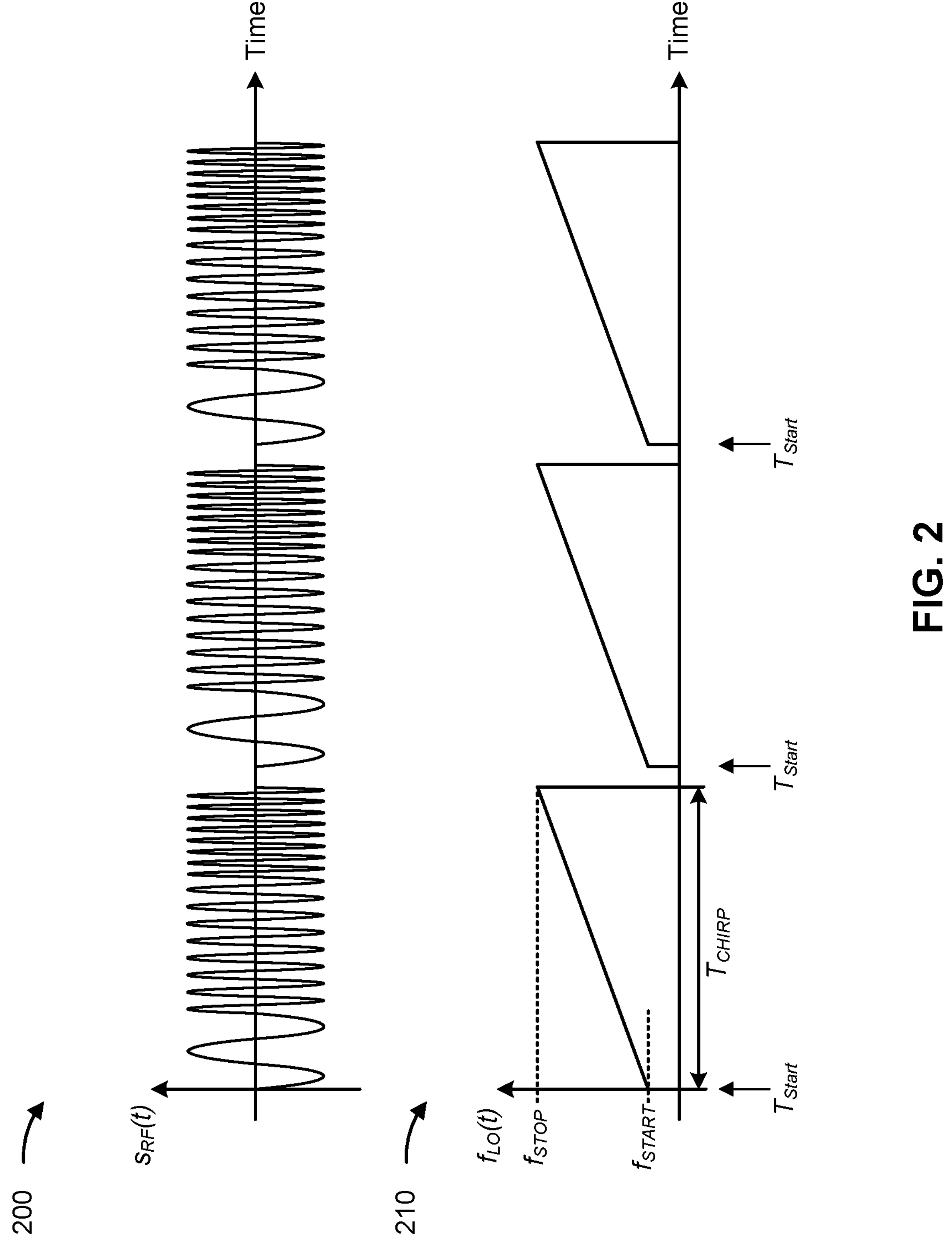
FIG. 2 illustrates an example of frequency modulation of a transmitted radar signal transmitted by the FMCW radar device.

FIG. 2 illustrates an example of the frequency modulation of the RF signal $s_{RF}(t)$. As illustrated in the upper diagram 200 of FIG. 2, the RF signal $s_{RF}(t)$ comprises a plurality of frequency ramps or a series of "chirps"; that is to say, the RF signal $s_{RF}(t)$ comprises a sequence of sinusoidal signal profiles (e.g., waveforms) with a rising frequency (referred to as an up-chirp) or a falling frequency (referred to as a down-chirp). In the example shown in FIG. 2, the instantaneous frequency $f_{LO}(t)$ of a chirp increases linearly, from a start frequency $f_{START}$, to a stop frequency $f_{STOP}$ within a time interval $T_{CHIRP}$, as shown in the lower diagram 210 of FIG. 2. Such chirps are also referred to as linear frequency ramps. For a measurement, a sequence of frequency ramps is emitted, and a resulting echo signal is evaluated in baseband to detect one or more radar targets.

A frequency-modulated ramp signal, such as a local oscillator signal used for generating a radar signal, may include a plurality of radar frames, which may also be referred to as radar operation cycles or chirp frames. A sequence of ramps may make up each radar frame. For example, a radar operation cycle may include several hundreds of radar ramps (sweeps) taking up to 10-30 milliseconds (ms) in total. A frame length of the radar frame may correspond to one radar operation cycle. Consecutive ramps may have a short pause therebetween, and a longer pause may be used between consecutive radar frames. The longer pause between consecutive radar frames may be referred to as a configuration interval, during which one or more ramp parameters of the RF signal $s_{RF}(t)$ can be adjusted for subsequent radar frames. A ramp start time $T_{START}$ indicates a start time for each chirp and may occur at a predetermined interval according to, for example, a number of clock cycles.

The start frequency $f_{START}$ and stop frequency $f_{STOP}$ of the ramps may be within a frequency band with minimum frequency $F_{min}$ and maximum frequency $F_{max}$. As a result, the minimum frequency $F_{min}$ and the maximum frequency $F_{max}$ define an operating frequency range or a frequency band usable for the ramping signals, and thus the frequency range or the frequency band of the radar application of a radar MMIC. In some implementations, the frequency range defined by a single ramp having start and stop frequencies $f_{START}$ and $f_{STOP}$ may be smaller than the usable radar frequency band. However, all ramps that are generated during operation may lie between the frequencies $F_{min}$ and $F_{max}$ of the radar frequency band (e.g., between 76-81 gigahertz (GHz)) used for generating the ramping signals.

FIG. 2 illustrates three identical linear frequency ramps or chirps. However, the parameters $f_{START}$, $f_{STOP}$, $T_{CHIRP}$, and/or the pause between the individual frequency ramps may vary depending on the actual implementation and/or use of the radar device 100. In practice, the frequency variation may be, for example, linear (linear ramp, frequency ramp), exponential (exponential ramp), or hyperbolic (hyperbolic ramp). In some implementations, the frequency may decrease instead of increase during time interval $T_{CHIRP}$. Furthermore, in some implementations, a center frequency of each ramp (and therefore $f_{START}$ and $f_{STOP}$) may vary (e.g., from ramp to ramp or after detecting an interference) to allow using the full or a part of the frequency band. In one example, the frequency band has a minimum frequency $F_{min}$ of 76 GHZ and a maximum frequency $F_{max}$ of 81 GHZ.

Thus, while three identical linear frequency ramps or chirps with the same start frequency $f_{START}$ and stop frequency $f_{STOP}$ are illustrated in FIG. 2, the start frequency $f_{START}$ and stop frequency $f_{STOP}$ may vary within a radar frame or across multiple radar frames. A local oscillator signal $s_{LO}(t)$ may be used to generate the RF signal $s_{RF}(t)$. Thus, it can be said that the local oscillator signal $s_{LO}(t)$ and the RF signal $s_{RF}(t)$ are frequency-modulated ramp signals that are generated within an operating frequency range (e.g., a predefined radar frequency range). For example, the local oscillator signal $s_{LO}(t)$ may be a frequency-modulated ramp signal that includes a plurality of frequency ramps, each starting at a respective ramp start frequency and ending at a respective ramp stop frequency, and the respective ramp start frequencies and the respective ramp stop frequencies of the plurality of frequency ramps define a frequency range within the bounds of the operating frequency range. The frequency range of the plurality of frequency ramps may be defined by the lowest start frequency $f_{START}$ and the highest stop frequency $f_{STOP}$ among the frequency ramps in a given time interval (e.g., in an implementation in which the frequency increases within each frequency ramp). As noted above, the start frequency $f_{START}$ and the stop frequency $f_{STOP}$ of a sequence of frequency ramps may be the same, and thus the center frequency of each ramp may be constant. Alternatively, the center frequency of each ramp (and therefore $f_{START}$ and $f_{STOP}$) may vary from ramp to ramp or after detecting an interference. The bandwidth (e.g., frequency range) of each ramp may also vary from ramp to ramp or after detecting an interference.

As indicated above, FIG. 2 is provided as an example. Other examples may differ from what is described with regard to FIG. 2.

Figure 3:
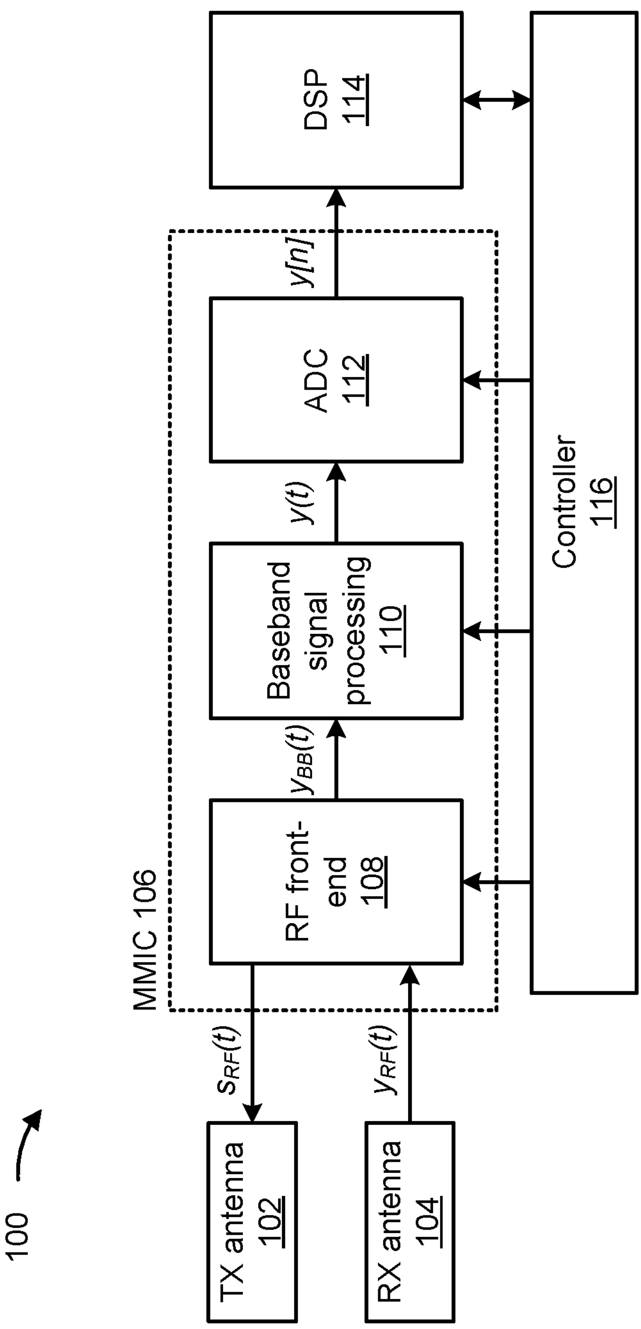
FIG. 3 is a block diagram that illustrates an example structure of the FMCW radar device.

FIG. 3 is a block diagram that illustrates an example structure of the radar device 100. As shown, the radar device 100 may include one or more TX antennas 102, one or more RX antennas 104, an MMIC 106 (comprising an RF front-end 108, a baseband signal processing circuit 110, and an analog-to-digital converter (ADC) 112), a digital signal processor (DSP) 114, and a controller 116. In some implementations, the MMIC 106 may include a digital front-end (DFE) coupled downstream from the ADC 112. The DFE may include circuit components associated with performing signal processing on a digital signal generated by the ADC 112 (e.g., digital filtering). In some cases, the DFE may include the DSP 114.

In the radar device 100, the one or more TX antennas 102 and the one or more RX antennas 104 are connected to the RF front-end 108. The RF front-end 108 may include circuit components associated with performing RF signal processing. These circuit components may include, for example, a local oscillator (LO), one or more RF power amplifiers, one or more LNAs, one or more directional couplers (e.g., rat-race couplers, circulators, or the like), or one or more mixers for downmixing (e.g., down-converting or demodulating) RF signals into baseband or an IF band. The RF front-end 108 may be integrated into the MMIC 106 with one or more other components, as shown in FIG. 3. The IF band is sometimes also referred to as baseband. Accordingly, “baseband” and “IF band” may be used interchangeably herein. Baseband signals are those signals on the basis of which radar targets are detected.

Antenna arrays may be used instead of single antennas. The depicted example shows a bistatic (or pseudo-monostatic) radar device, which has separate RX and TX antennas. In the case of a monostatic radar device, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar devices often include several TX and RX channels, which allows for measurement of the direction (e.g., direction of arrival) from which the radar echoes are received. Thus, in some implementations, the radar device 100 may include a plurality of TX antennas 102 and a plurality of RX antennas 104, which enables the radar device 100 to measure an AoA from which radar echoes are received. In the case of such MIMO systems, individual TX channels and RX channels may be constructed identically or similarly and may be distributed over one or more MMICs 106.

In some implementations, a signal emitted by the TX antenna 102 may be in a range from approximately 20 GHz to approximately 100 GHz, such as in a range between approximately 76 GHZ and approximately 81 GHZ. As mentioned, a radar signal received by the RX antenna 104 includes radar echoes (e.g., chirp echo signals); that is to say, those signal components that are backscattered at one or more targets.

The received RF signal $y_{RF}(t)$ is downmixed into, for example, baseband to generate a baseband signal $y_{BB}(t)$, and the baseband signal $y_{BB}(t)$ is processed further in baseband by way of analog signal processing performed by the baseband signal processing circuit 110. In some implementations, the baseband signal processing circuit 110 may be configured to filter and/or amplify the baseband signal $y_{BB}(t)$ to generate an analog (baseband) output signal y(t) that is derived from the baseband signal $y_{BB}(t)$. The baseband signal $y_{BB}(t)$ may also be referred to as analog radar data. If the received RF signals are down-converted into the IF band, the baseband signal processing circuit 110 may be referred to as an IF signal processing circuit. Thus, the baseband signal processing circuit 110, in general, may also be referred to as an analog signal processing circuit.

The ADC 112 may be configured to digitize the baseband signal $y_{BB}(t)$ or the analog output signal y(t) to generate a digital baseband signal y[n], also referred to as a digital output signal. The digital baseband signal y[n] is representative of the radar data received in the received RF signal $y_{RF}(t)$. The DSP 114 may be configured to further process the digital baseband signal y[n] in the digital domain. For example, the DSP 114 may be configured to receive the digital radar data in the digital baseband signal y[n] and process the digital radar data using the ramp parameters (e.g., respective ramp start frequencies, the respective ramp stop frequencies, a bandwidth of a frequency range, a ramp start time, or a sampling start time) used to generate the respective frequency ramps of the received RF signal $y_{RF}(t)$ in order to generate a range Doppler map, which may then be further used by the DSP 114 for object detection, classification, and so on.

In some implementations, the controller 116 is configured to control operation of the radar device 100 (e.g., by controlling one or more other components of the radar device 100, as indicated in FIG. 3). The controller 116 may include, for example, a microcontroller (μC).

In some implementations, the RF front-end 108, the baseband signal processing circuit 110, the ADC 112, and/or the DSP 114 may be integrated in a single MMIC 106 (e.g., an RF semiconductor chip). Alternatively, two or more of these components may be distributed over multiple MMICs 106. In some implementations, the DSP 114 may be included in the controller 116.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3. Furthermore, two or more devices or components shown in FIG. 3 may be implemented within a single device or component, or a single device or component shown in FIG. 3 may be implemented as multiple, distributed devices or components. Additionally, or alternatively, a set of devices or components (e.g., one or more devices or components) shown in FIG. 3 may perform one or more functions described as being performed by another set of devices or components shown in FIG. 3.

Figure 4:
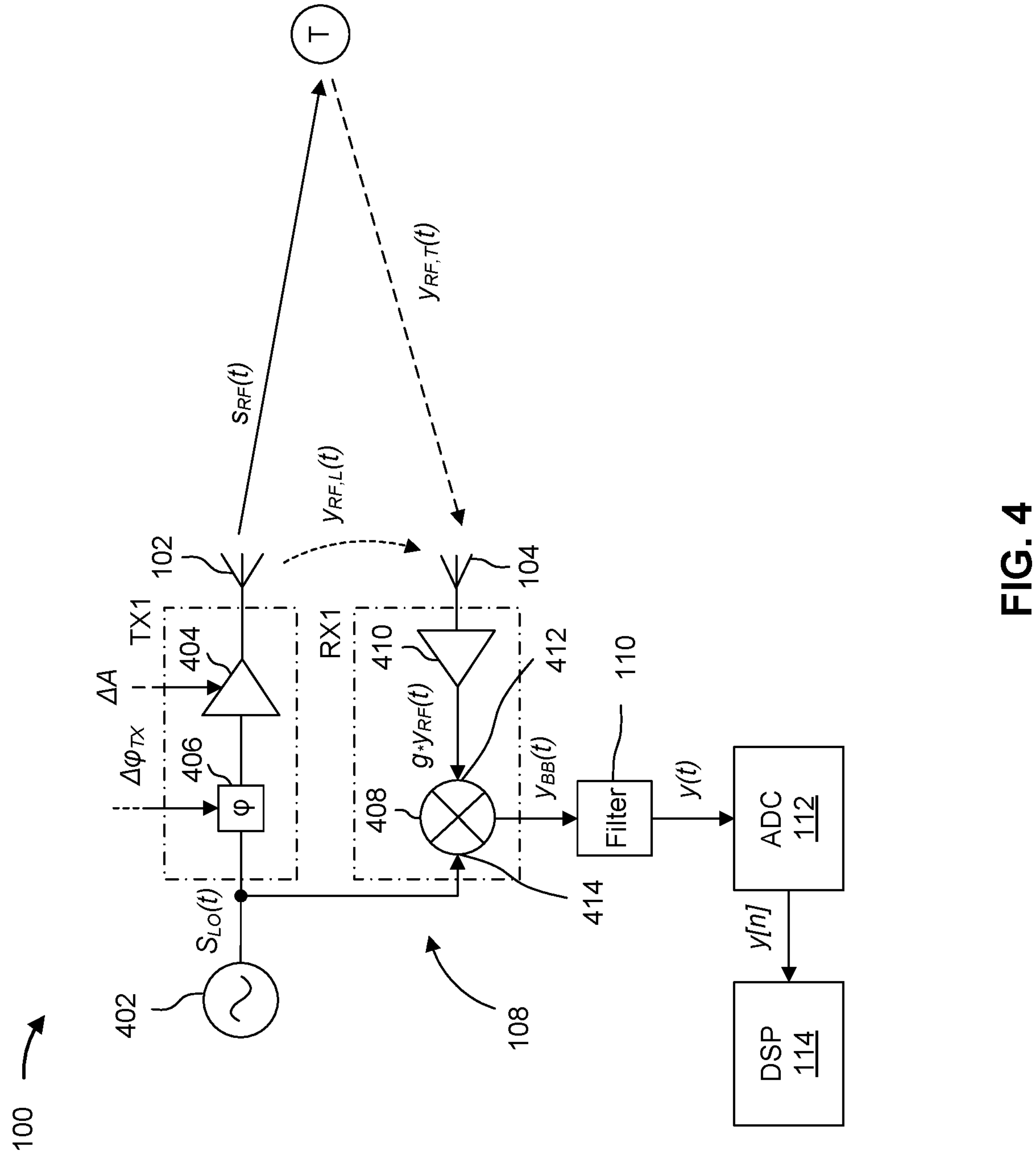
FIG. 4 illustrates an example implementation of the FMCW radar device according to the example from FIG. 3.

FIG. 4 illustrates an example implementation of the radar device 100 according to the example from FIG. 3. The example shown in FIG. 4 illustrates an example of the RF front-end 108 of the radar device 100. FIG. 4 illustrates a simplified circuit diagram to show a fundamental structure of the RF front-end 108 with one TX channel TX1 and one RX channel RX1. As noted above, the radar device 100 may in practice include a plurality of TX channels and/or a plurality of RX channels.

The RF front-end 108 comprises an LO 402 that generates an RF oscillator signal $s_{LO}(t)$. The RF oscillator signal $s_{LO}(t)$ is frequency-modulated during operation (e.g., as described above with reference to FIG. 2) and may also be referred to as an LO signal, an input RF signal, or a reference signal. In radar applications, the LO signal may be in a super high frequency (SHF) band (e.g., centimeter wave) or in an extremely high frequency (EHF) band (e.g., millimeter wave), for example, in a range between approximately 76 GHZ and approximately 81 GHz. In some radar applications, the LO signal may be in a 24 GHz industrial, scientific, and medical (ISM) band. The LO signal may also be generated at a lower frequency and then up-converted using frequency multiplication units. The LO signal $s_{LO}(t)$ is processed both in the transmitted radar signal path TX1 (in the TX channel) and in the received RF signal path RX1 (in the RX channel).

While the LO 402 may be provided on a chip, the LO 402 may also be provided external thereto. For example, the LO signal may be provided by an external local oscillator, and/or the LO signal may be provided to the MMIC 106 by another MMIC in a primary/secondary relationship. In particular, the MMIC 106 may be part of a MIMO radar device comprising a plurality of coupled (cascaded) MMICs in which one of the MMIC is configured as a primary MMIC and the remaining MMICs are configured as secondary MMICs. Each of the MMICs may include a local oscillator that generates a respective RF oscillator signal $s_{LO}(t)$. However, for the operation of the MIMO radar device, it may be beneficial for LO signals used by the MMICs to be coherent. Therefore, the LO signal may be generated in one MMIC (e.g., the primary MMIC), and a representation of the LO signal may be distributed to the secondary MMICs. The representation may, for example, be identical to the LO signal, or the representation may be a frequency-divided signal which is then reconstructed at each MMIC by frequency multiplication. While in the following description, a distribution of the LO signal will be described, the following description may also be applied to a frequency-divided distribution of the LO signal. In some implementations, the primary MMIC may also use the LO signal to feed itself via a signal loop to ensure that the LO signal is equally delayed between the primary MMIC and the secondary MMICs.

The RF oscillator signal $s_{LO}(t)$ is processed both in the transmission signal path TX1 (in the TX channel) and in the received signal path RX1 (in the RX channel). The RF signal $s_{RF}(t)$ (i.e., the outgoing radar signal) transmitted by the TX antenna 102 may be generated by amplifying the RF oscillator signal $s_{LO}(t)$, for example by an RF power amplifier 404, and may therefore be an amplified and possibly phase-shifted (e.g., by a phase shifter 406) version of the RF oscillator signal $s_{LO}(t)$. The transmission channel may also include a phase shifter 406 for applying a programmable phase shift φ to the RF oscillator signal $s_{LO}(t)$. For example, the phase shifter 406 may be configurable by a phase control signal $\Delta\varphi_{TX}$ and may be used to manipulate the overall phase lag caused by the transmission channel TX1. The magnitude or power level (e.g., gain) of the RF power amplifier 404 may also be programmable and adjustable by a gain control signal ΔA.

Both the phase control signal $\Delta\varphi_{TX}$ and the gain control signal ΔA may be set and adjusted by a controller of the radar device 100 (e.g., controller 116). For example, by setting the power level of the RF power amplifier 404, the transmit power of the transmission channel TX1 may be set to a transmission power while the LO 402 generates the RF oscillator signal $s_{LO}(t)$ with the frequency ramps intended to be transmitted as the RF signal $s_{RF}(t)$ (e.g., the transmission signal) and received as the received RF signal $y_{RF}(t)$ for the processing of radar data. The output of the RF power amplifier 404 can be coupled to the TX antenna 102 (in the case of a bistatic/pseudo-monostatic radar configuration). In some cases, the power level of the RF power amplifier 404 may be set to zero to disable the transmission channel TX1 (e.g., to disable a transmission of the RF signal $s_{RF}(t)$). In other words, while the power level of the RF power amplifier 404 is set to zero, the output power of the RF power amplifier 404 is zero and no signal is provided to the TX antenna 102.

The RX channel RX1 includes a mixer 408 and an optional amplifier 410. The received RF signal $y_{RF}(t)$ received by the RX antenna 104 is supplied to a receiver circuit in the RX channel RX1 and hence directly or indirectly to an RF port 412 of the mixer 408. In the present example, the received RF signal $y_{RF}(t)$ (antenna signal) is pre-amplified by the amplifier 410 with a gain g. The mixer 408 thus receives the amplified received RF signal $g \cdot y_{RF}(t)$. The amplifier 410 can be, for example, a low-noise amplifier.

The mixer 408 further includes a reference port 414 that may be supplied with the RF oscillator signal $s_{LO}(t)$ so that the mixer 408 down-converts the (pre-amplified) received RF signal $y_{RF}(t)$ to the baseband (or the IF band). The down-converted baseband signal (mixer output signal) is denoted by $y_{BB}(t)$. This baseband signal $y_{BB}(t)$ is processed further in the analog domain by the baseband signal processing circuit 110, substantially causing an amplification and a filtering (e.g., bandpass filtering, low-pass filtering, and/or high-pass filtering) in order to, for example, reject undesirable sidebands and/or mirror frequencies. The resulting analog output signal is denoted by y(t) and is supplied to the ADC 112. The ADC 112 is configured to convert the analog output signal y(t) into the digital baseband signal y[n] (e.g., the digital output signal) that undergoes further digital post-processing via a signal processor (e.g., the DSP 114). Further digital processing of the digital baseband signal y[n] may include, for example, range Doppler analysis.

In the present example, the mixer 408 may down-convert the pre-amplified received RF signal $g \cdot y_{RF}(t)$ (e.g., the amplified antenna signal) into baseband. In some implementations, the mixing may be performed in one stage (e.g., from the RF band directly into baseband) or over one or more intermediate stages (e.g., from the RF band into an intermediate frequency band, and further into baseband). In the latter case, the mixer 408 may comprise a plurality of individual mixer stages connected in series. In some implementations, a mixer stage may include an in-phase and quadrature (IQ) mixer that generates two baseband signals (in-phase and quadrature signals) that can be interpreted as a real part and an imaginary part of a complex baseband signal. In other words, the IQ mixer may be used to generate complex baseband signals (e.g., including in-phase and quadrature components).

As depicted in FIG. 4, the RX antenna 104 of the RX channel RX1 may receive a superimposition comprising a received RF signal $y_{RF,T}(t)$ reflected from the target T and a direct crosstalk from the transmitting antenna 102, which is also referred to as leakage signal $y_{RF,L}(t)$. Reflections from an object situated right in front of the antennas (sometimes also called "blockers") are also referred to as crosstalk here, and may contribute to the leakage signal. Both signals $y_{RF,T}(t)$ and $y_{RF,L}(t)$ are substantially delayed and attenuated versions of the RF signal $s_{RF}(t)$ of the transmission channel TX1. A time delay between the RF signal $s_{RF}(t)$ of the transmission channel TX1 and the received leakage signal $y_{RF,L}(t)$ (e.g., the crosstalk signal) is relatively short in comparison with a time delay of the received RF signal $y_{RF,T}(t)$ received from the target T. In a normal radar mode, the received leakage signal $y_{RF,L}(t)$ may therefore cause a corresponding low-frequency component in the baseband signal $y_{BB}(t)$, and this low-frequency component of the baseband signal $y_{BB}(t)$ may be rejected in the baseband signal processing circuit 110. For this purpose, the baseband signal processing circuit 110 may include a bandpass filter, a low-pass filter, and/or a high-pass filter having a suitable cut-off frequency.

As indicated above, FIG. 4 is provided as an example. Other examples may differ from what is described with regard to FIG. 4. The number and arrangement of devices and components shown in FIG. 4 are provided as an example. In practice, there may be additional devices or components, fewer devices or components, different devices or components, or differently arranged devices or components than those shown in FIG. 4. Furthermore, two or more devices or components shown in FIG. 4 may be implemented within a single device or component, or a single device or component shown in FIG. 4 may be implemented as multiple, distributed devices or components. Additionally, or alternatively, a set of devices or components (e.g., one or more devices or components) shown in FIG. 4 may perform one or more functions described as being performed by another set of devices or components shown in FIG. 4.

Figure 5:
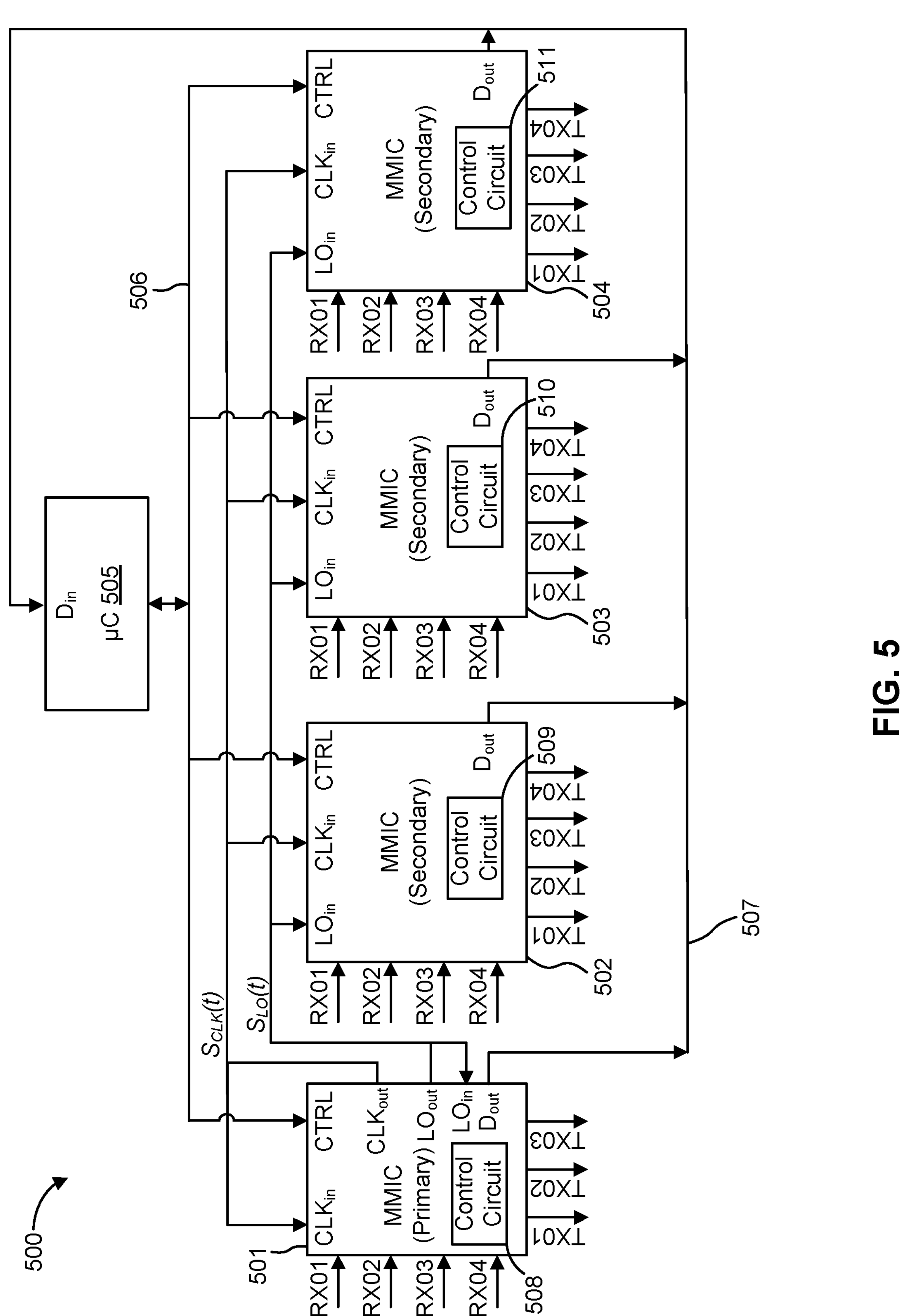
FIG. 5 is a schematic block diagram for illustrating a cascaded radar system comprising a controller and a plurality of cascaded monolithic microwave integrated circuits (MMICs) according to one or more implementations.

FIG. 5 is a block diagram for illustrating a cascaded radar system 500 comprising a controller and a plurality of cascaded MMICs according to one or more implementations. In particular, the cascaded radar system 500 is a MIMO radar system comprising a plurality of coupled (cascaded) MMICs 501, 502, 503, and 504 that are further coupled to a microcontroller 505. The microcontroller 505 may implement some of the functionality of the controller 116 described in connection with FIG. 3. While the microcontroller 505 is shown external to the MMICs 501-504, the microcontroller 505 may be integrated within one of the MMICs 501-504 while performing the same functions described herein. In addition, the MMIC 501 may be configured as a primary MMIC and the MMICs 502, 503, and 504 may be configured as secondary MMICs. For example, a secondary MMIC may use one or more signals and/or information provided by the primary MMIC to perform one or more functions.

Each MMIC 501, 502, 503, and 504 can comprise a plurality of transmitting channels TX01, TX02, TX03, TX04 and a plurality of receiving channels RX01, RX02, RX03, RX04. Each of the transmitting channels may be coupled to a respective transmit antenna for transmitting radar signals and each of the receiving channels may be coupled to a respective receive antenna for receiving (reflected) radar signals. However, as noted above, it is also possible that an MMIC only includes a receiver with no transmitter or a transmitter with no receiver. Thus, in some cases, an MMIC may not include any transmitting channels or may not include any receiving channels.

Each of the MMICs 501-504 may include an LO that generates an RF oscillator signal $s_{LO}(t)$ (e.g., an LO signal). However, for the operation of the cascaded radar system 500, it may be beneficial for the LO signals used by the MMICs 501-504 to be coherent. Therefore, the RF oscillator signal $s_{LO}(t)$ may be generated in one MMIC (e.g., MMIC 501 as the primary MMIC) and for a representation of the RF oscillator signal $s_{LO}(t)$ to be distributed to the secondary MMICs 502, 503, and 504. For example, the representation of the RF oscillator signal $s_{LO}(t)$ may be identical to the RF oscillator signal $s_{LO}(t)$, or the representation of the RF oscillator signal $s_{LO}(t)$ may be a frequency-divided signal which is then reconstructed at each secondary MMIC by frequency multiplication.

While in the following example a distribution of the RF oscillator signal $s_{LO}(t)$ is described, a frequency-divided distribution of the RF oscillator signal $s_{LO}(t)$ may also be used in some implementations. In the example illustrated, for this purpose, the RF oscillator signal $s_{LO}(t)$ is passed from an LO output $LO_{out}$ of the primary MMIC 501 to the LO inputs $LO_{in}$ of respective secondary MMICs 502, 503, and 504. In some implementations, a unidirectional power splitter may first receive the RF oscillator signal $s_{LO}(t)$ from the primary MMIC 501, and distribute the split signal to the LO inputs $LO_{in}$ of the secondary MMICs 502, 503, and 504. In some implementations, the LO output $LO_{out}$ of the primary MMIC 501 may be coupled to the LO input $LO_{in}$ of the primary MMIC 501 such that the primary MMIC 501 can feed itself the RF oscillator signal $s_{LO}(t)$ to ensure that the RF oscillator signal $s_{LO}(t)$ is equally delayed between the primary MMIC 501 and the secondary MMICs 502, 503, and 504.

The LO output $LO_{out}$ and the LO inputs $LO_{in}$ can be realized as a pin, a solder ball, or the like, depending on the chip package of the MMIC. In some example implementations, the LO output $LO_{out}$ and/or the LO inputs $LO_{in}$ can be realized by dedicated external contacts (e.g., pin, solder ball, etc.). In order to keep the number of external contacts of the MMICs small, the output of a transmitting channel (e.g., channel TX04) can also be reconfigured as LO output or LO input. However, a transmitting channel configured as an LO output or LO input is then no longer available as an antenna port for connection to a (transmitting) antenna. In accordance with the example illustrated in FIG. 5, in the primary MMIC 501, the RF output of the transmitting channel TX04 can be configured as an LO output, for which purpose it is useful to adapt the gain of the RF amplifier (cf. FIG. 4, amplifier 404). The resultant adaptation (reduction) of the signal power may be useful or expedient in order to minimize crosstalk to the receiving channels RX01, RX02, or the like, and in order to save energy. In the case of secondary MMICs 502, 503, and 504, the RF outputs of the respective transmitting channels TX04 may be configured as LO inputs, which can be realized by means of couplers and/or switches.

In the example illustrated in FIG. 5, the outputs designated by TX01, TX02, TX03, and TX04 can be connected to (transmitting) antennas, and the inputs designated by RX01, RX02, RX03 and RX04 can be connected to (receiving) antennas. All of the MMICs 501-504 can each comprise a local oscillator (e.g., LO 402), but the local oscillators may not be used in the MMICs 502-504 that are configured as secondary MMICs. For normal radar operation, the RF oscillator signal $s_{LO}(t)$ may be generated centrally in the primary MMIC 501 and distributed to the secondary MMICs 502-504. As a result, the RF oscillator signals $s_{LO}(t)$ processed in the MMICs 501-504 are coherent.

In the example illustrated in FIG. 5, the primary MMIC 501 may generate the RF oscillator signal $s_{LO}(t)$ and distribute the RF oscillator signal $s_{LO}(t)$ via the LO output of the primary MMIC 501 to the secondary MMICs 502, 503, and 504. As a result, the MMICs 501-504 can be connected in a cascaded configuration. A clock signal $s_{CLK}(t)$ (e.g., a system clock signal) can likewise be generated by the primary MMIC 501 and distributed to the secondary MMICs 502, 503, and 504. The primary MMIC 501 may generate the clock signal $s_{CLK}(t)$ from a reference clock signal received from a separate reference clock generator, such as a quartz oscillator. For this purpose, the MMICs 501, 502, 503, and 504 each have a separate clock output $CLK_{out}$ or clock input $CLK_{in}$, which can be connected by means of strip lines. The clock signal $s_{CLK}(t)$ can have a clock frequency in a megahertz (MHz) range (e.g., 200 MHZ), whereas the LO signal may have an LO frequency $f_{LO}$ of a plurality of GHz (e.g., 76-81 GHZ) or a corresponding divided value (e.g., 13 GHZ or 39 GHZ). Alternatively, the clock signal $s_{CLK}(t)$ can be generated by the reference clock. In this case, the clock signal $s_{CLK}(t)$ generated by the clock generator chip is fed to all of the MMICs (primary MMIC 501 and secondary MMICs 502-504).

In some implementations, the microcontroller 505 may be configured to transmit control signals to the MMICs 501, 502, 503, and 504 using a control signal bus 506. The control signals may be used to control one or more functions of the MMICs 501, 502, 503, and 504. The control signals may be received at a control input CTRL of the MMICs 501, 502, 503, and 504. The control signals may be provided from the control input CTRL to a processing component of a respective MMIC. For example, the processing component may be an integrated controller or other processing circuitry of the respective MMIC.

In some implementations, each MMIC 501, 502, 503, and 504 may further include a data output Dout for transmitting data. The data from each MMIC 501, 502, 503, and 504 may be transmitted as feedback information to the microcontroller 505 that receives the data at a data input Din. Based on the received data from one or more of the MMICs 501, 502, 503, and 504, the microcontroller 505 may control one or more functions of one or more of the MMICs 501-504. For example, the microcontroller 505 may be configured to receive the data from the MMICs 501, 502, 503, and 504 via a data bus 507 and generate control signals based on the received data. In some implementations, the control signals may be disable signals or enable signals that control the activation and deactivation of the radar signal channels, including transmitting channels and/or receiving channels, at each MMIC 501, 502, 503, and 504. In some implementations, the control signals may be phase control signals that control a phase of one or more of the radar signal channels. For example, the phase control signals may be used to control a phase setting of the phase shifters 406 of the MMICs 501, 502, 503, and 504.

As further shown, each MMIC 501, 502, 503, and 504 may include a respective control circuit 508-511 (e.g., a radar operation controller) that is configured to control one or more components of a corresponding MMIC. A control circuit 508-511 may implement some of the functionality of the controller 116 described in connection with FIG. 3. For example, each control circuit 508-511 may trigger a start of a radar frame that comprises a sequence of frequency ramps for its corresponding MMIC. In some implementations, each control circuit 508-511 may initiate a radar frame by starting a transmission of the sequence of frequency ramps. Each control circuit 508-511 may initiate the radar frame based on receiving a trigger. In some implementations, each control circuit 508-511 may generate phase information based on a monitoring operation and output the phase information via a respective data output Dout. In some implementations, each control circuit 508-511 may receive control signals from the microcontroller 505.

As indicated above, FIG. 5 is provided as an example. Other examples may differ from what is described with regard to FIG. 5.

Figure 6A:
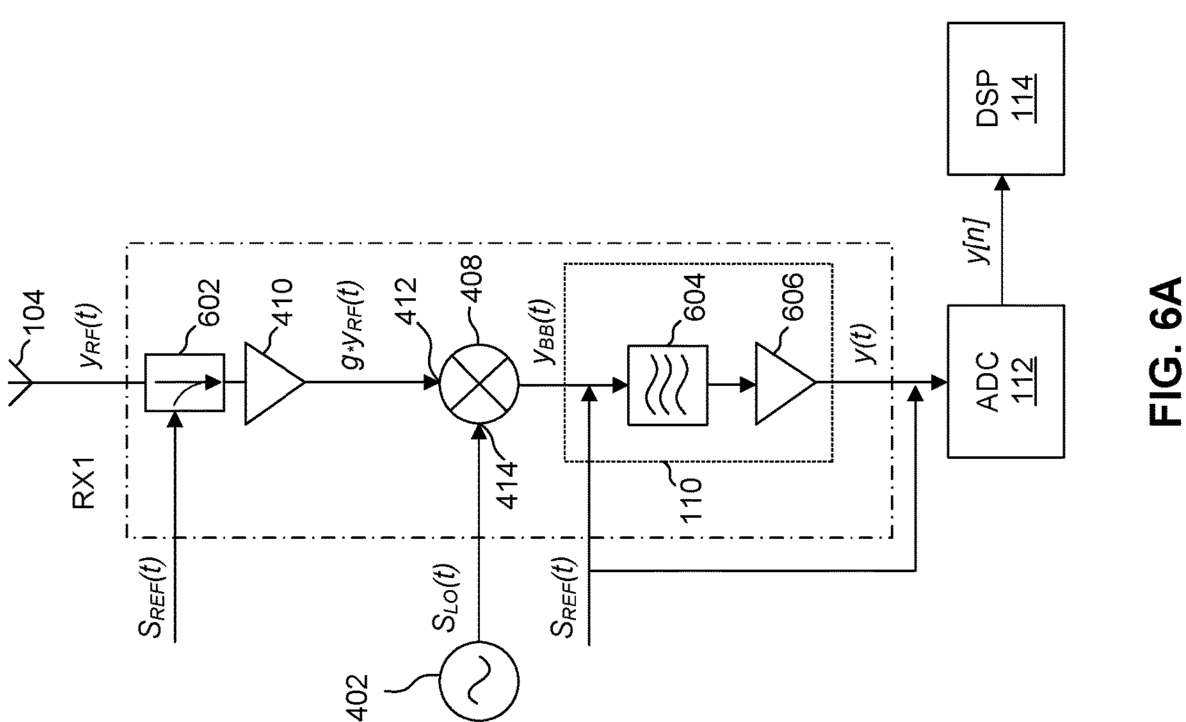
FIGS. 6A-6E are diagrams illustrating examples associated with performing phase correction using a measured baseband delay.
Figure 6B:
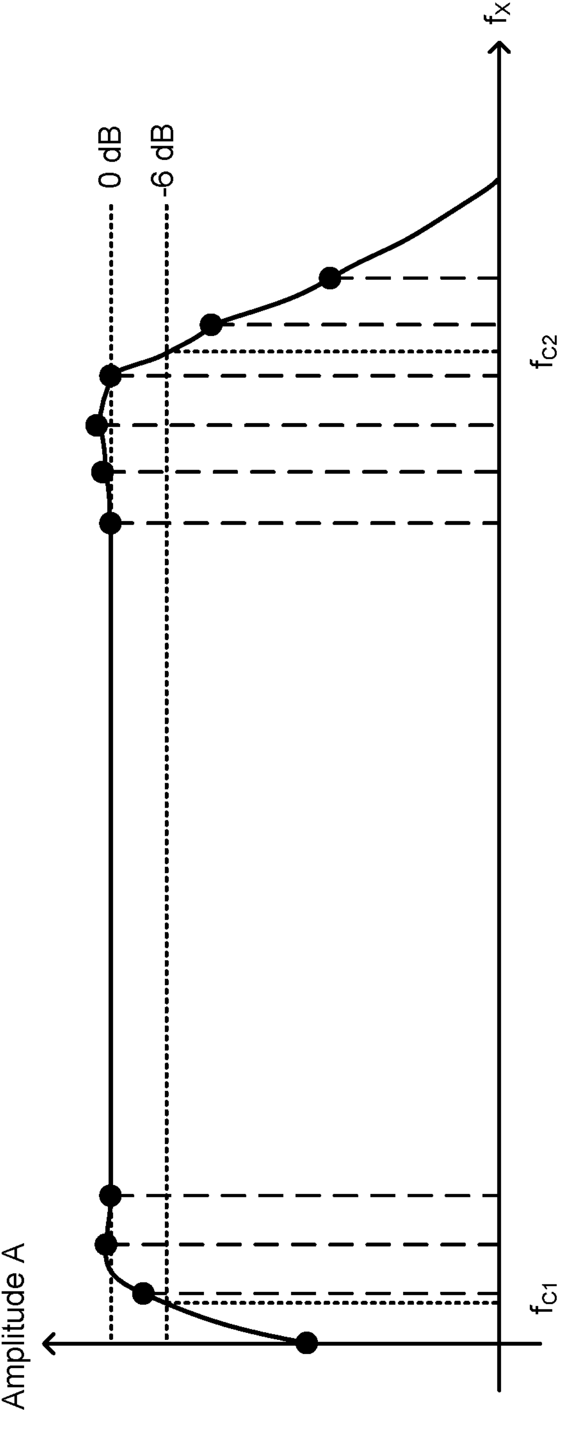
Figure 6C:
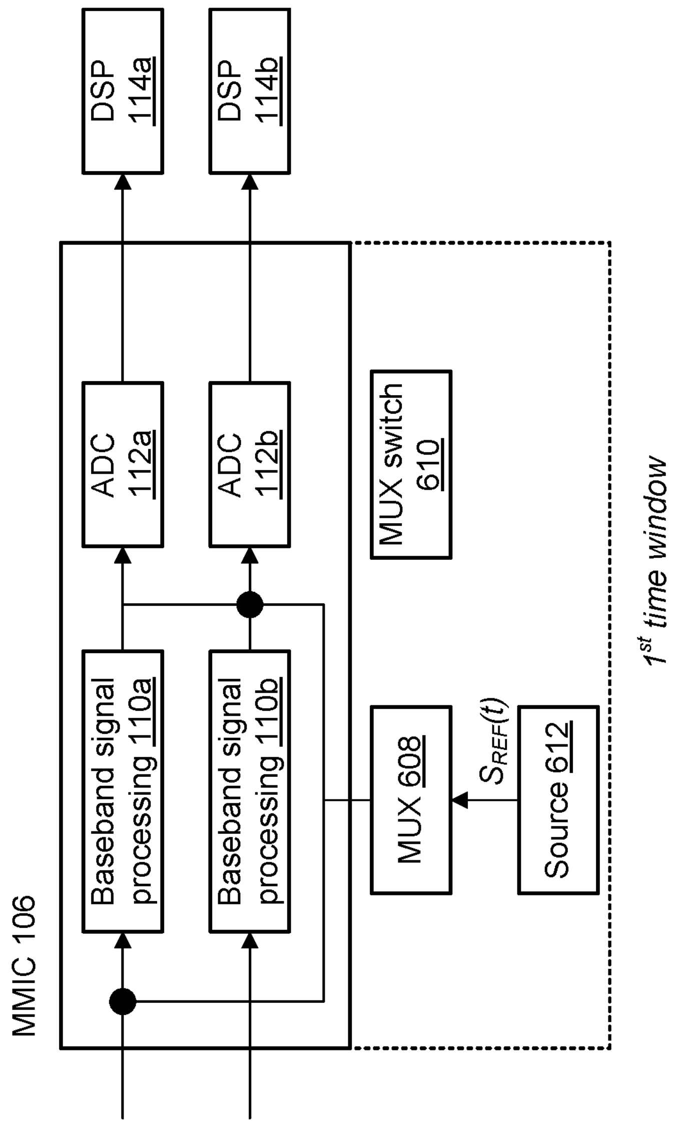
Figure 6D:
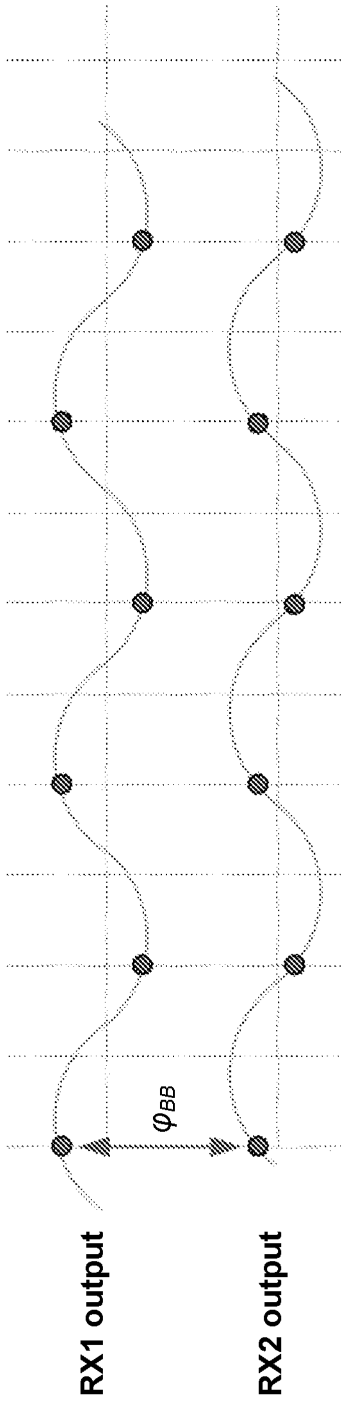
Figure 6E:
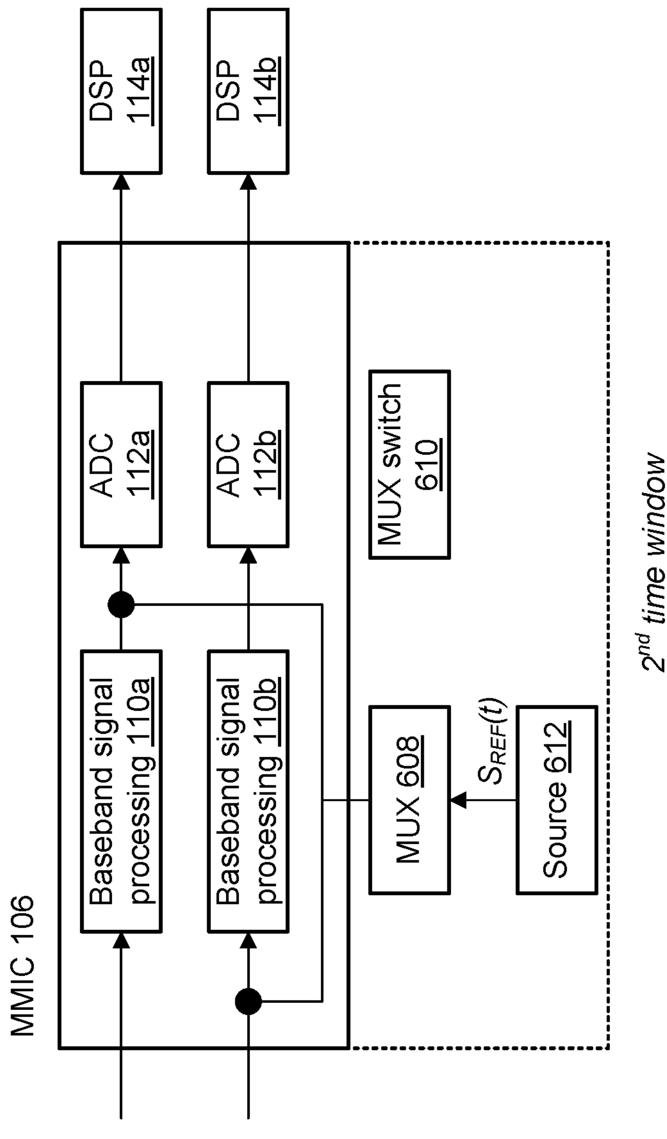

FIGS. 6A-6E are diagrams illustrating examples associated with performing phase correction using a measured baseband delay. More particularly, FIG. 6A illustrates an example process of feeding a reference signal into an RX channel (e.g., RX1) of a radar device 100 in association measuring a magnitude response of an analog baseband processing component, such as baseband signal processing circuit 110. FIG. 6B illustrates an example of the magnitude response of the analog baseband processing component, which can be used to determine a corner frequency associated with the analog baseband processing component. FIGS. 6C-6E illustrate an example of measuring a baseband delay associated with the analog baseband processing component. As described below, a phase response of the analog baseband processing component can be determined based on the corner frequency, the baseband delay, and a phase transfer function model associated with the analog baseband processing component. While the examples shown in FIG. 6A-6E are described with respect to one RX channel (RX1), the technique described with respect to FIGS. 6A-6E can be used for any RX channel of the radar device 100.

The RX channel RX1 shown in FIG. 6A differs from the RX channel illustrated in FIG. 4 in that the RX channel RX1 shown in FIG. 6A includes a coupler 602 that enables a reference signal $s_{REF}(t)$ to be injected into the RF signal path (e.g., in addition or alternative to the received RF signal $y_{RF}(t)$ received via the receive antenna 104). As further shown, the reference signal can be (selectively) injected at a first node in the baseband signal processing circuit 110 of the RX channel RX1 and/or at a second node in the RX channel RX1 (e.g., in association with measuring a baseband delay $\varphi_{BB}$ associated with the baseband signal processing circuit 110 in RX channel RX1 or in association with measuring a baseband delay $\varphi_{BB}$ associated with a baseband signal processing circuit 110 in another RX channel of the radar device 100, as described below with respect to FIGS. 6C-6E). The mixer 408 and the subsequent baseband signal processing circuit 110 process the reference signal $s_{REF}(t)$ in the same manner as the receives RF signal $y_{RF}(t)$. The coupler 602 may include, for example, a branch-line coupler, a tapered-line couplers, or a rat-race couplers, among other examples.

In some implementations, the reference signal $s_{REF}(t)$ is a CW signal and a frequency $f_{REF}$ of the reference signal $s_{REF}(t)$ differs from a frequency $f_{LO}$ of the RF oscillator signal $s_{LO}(t)$ by a defined frequency offset $f_X$ (e.g., $f_{REF}=f_{LO}+f_X$). Therefore, the baseband signal $y_{BB}(t)$, when generated from the reference signal $s_{REF}(t)$, has the frequency $f_X$ in the absence of an RF signal $y_{RF}(t)$. That is to say, a filter component 604 the baseband signal processing circuit 110 sees a CW signal at the frequency $f_X$. In some implementations, as an alternative to the reference signal $s_{REF}(t)$, a baseband signal at the frequency $f_X$ can be fed directly into the baseband signal processing circuit 110, which case the coupler 602 is not needed. As shown in FIG. 6A, the baseband signal processing circuit 110 may in some implementations include an amplifier 606 (e.g., a PGA).

The baseband signal $y_{BB}(t)$ at the frequency $f_X$ is attenuated by one or more components of the filter component 604 in accordance with filter characteristics. The filter component 604 may include, for example, an HPF, an AAF (e.g., comprising a low pass filter (LPF), a programmable gain amplifier (PGA)), or one or more other components. The analog output signal y(t) from the baseband signal processing circuit 110 is digitized by the ADC 112 and the amplitude A of the digital baseband signal y[n] can be determined by the DSP 114. Here, the amplitude A of the digital baseband signal y[n] is proportional to the amplitude of the analog output signal y(t).

In some implementations, the radar device 100 (e.g., the DSP 114, the controller 116, or the like) may determine a high pass corner frequency associated with baseband signal processing circuit 110 in the RX channel RX1. For example, the radar device 100 may vary the frequency $f_X$ (e.g., in stages) and a resulting amplitude A of the digital baseband signal y[n] can be determined for each of the different frequency values for frequency $f_X$. An example associated with such a procedure is illustrated in FIG. 6B. Here, the frequency-dependent amplitude $A(f_X)$—that is to say, the magnitude response of the baseband signal processing circuit 110 is determined point-by-point for each of the frequency values of frequency $f_X$. In FIG. 6B, the high pass corner frequency $f_{CH}$ can be determined from the magnitude response $|A(f_X)|$ determined in this manner. In this example, the high pass corner frequency $f_{CH}$ is a frequency at which the amplitude A has fallen by a threshold amount, such as 6 decibels (dB) (i.e., been reduced by approximately a factor of 2). That is to say, $|A(f_{CH})|/A0=\frac{1}{2}$, where A0 represents the amplitude at the 0 dB line, as illustrated in FIG. 6B. Of course, of the magnitude response instead of the 6 dB cut-off frequencies. Another characteristic value or threshold value is, for example, the 3 dB cut-off frequency. The magnitude response is also referred to as the amplitude response. A frequency response is a spectrum that includes a magnitude response and a phase response. The measured magnitude response information therefore represents the characteristic profile of the magnitudes of the amplitudes $A(f_X)$ based on frequency.

As illustrated in FIG. 6B, a low pass corner frequency $f_{CL}$ could be determined in a similar manner. However, in some implementations, the radar device 100 need not determine the low pass corner frequency. Rather, the radar device 100 may measure a baseband delay $\varphi_{BB}$ associated with the baseband signal processing circuit 110, as described below. Thus, in some implementations, the radar device 100 may determine only the high pass corner frequency $f_{CH}$ and not the low pass corner frequency $f_{CL}$.

In some implementations, the radar device 100 (e.g., the DSP 114, the controller 116, or the like) may measure a baseband delay $\varphi_{BB}$ associated with the baseband signal processing circuit 110 in the RX channel RX1. As noted above, FIGS. 6C-6E illustrate an example of measuring a baseband delay associated with the baseband signal processing circuit 110.

As shown in FIG. 6C, in association with measuring the baseband delay $\varphi_{BB}$ associated with the baseband signal processing circuit 110*a* in RX channel RX1, the radar device 100 may, during a first time window, provide the reference signal $s_{REF}(t)$ at a first node in the baseband signal processing circuit 110*a* of the RX channel RX1 and at a second node in the RX channel RX2 of the radar device 100. In one example, the first node in the baseband signal processing circuit 110*a* of the RX channel RX1 is an input of a TIA and the second node of the RX channel RX2 is the ADC 112*b*. In some implementations, the first node being before the TIA on the signal path enables parasitic influence of the TIA to be compensated (e.g., since the parasitic influence of the TIA will be represented in the baseband delay $\varphi_{BB}$ computed in the manner described below). More generally, the first node may be between the mixer 408 of the RX channel RX1 and the baseband signal processing circuit 110*a*, and the second node may be between a baseband signal processing circuit 110*b* in the RX channel RX2 and the ADC 112*b*. In some implementations, the reference signal $s_{REF}(t)$ may be a single tone signal. Alternatively, the reference signal $s_{REF}(t)$ may in some implementations be a multi-tone signal. In some implementations, the reference signal $s_{REF}(t)$ may a square wave signal.

In practice, phase transfer functions of the ADCs 112 of the radar device 100 may be strongly correlated, meaning that the RX channels of the radar device 100 are well matched and, as such, can be used for phase measurement. Thus, the reference signal $s_{REF}(t)$ can be fed through a multiplexer (MUX) 608 to each of the RX channels for phase measurement associated with each RX channel. In some implementations, as illustrated in FIG. 6C, a MUX switch 610 can be used to cause the reference signal $s_{REF}(t)$ to be input at different nodes in the RX channels during a given time window. In some implementations, the reference signal $s_{REF}(t)$ may be generated by an on-chip signal source and provided via an on-chip signal multiplexer. That is, in some implementations, RX channels of the radar device 100 are implemented on a MMIC 106, and the reference signal $s_{REF}(t)$ is generated by a source 612 on the same MMIC 106 and provided to the RX channels via the MUX 608 (also implemented on the same MMIC 106). Alternatively, the MUX 608 and/or the source 612 may in some implementations be external to the MMIC 106.

In some implementations, the radar device 100 can evaluate digital baseband signals y[n] generated from the reference signal $s_{REF}(t)$ to determine the baseband delay $\varphi_{BB}$ associated with the baseband signal processing circuit 110*a* in the RX channel RX1. For example, the radar device 100 can determine the baseband delay $\varphi_{BB}$ associated with the baseband signal processing circuit 110*a* in the RX channel RX1 based on a difference between a phase of a digitized version of the reference signal $s_{REF}(t)$ (i.e., a digital baseband signal y[n]) at an output of the RX channel RX1 and a phase of a digitized reference signal $s_{REF}(t)$ at an output of the RX channel RX2. FIG. 6D is a diagram illustrating an example phase difference as determined by the radar device 100 when the reference signal $s_{REF}(t)$ is provided at the first node in the baseband signal processing circuit 110*a* of the RX channel RX1 and at the second node in the RX channel RX2 of the radar device 100. In this way, the radar device 100 may measure the baseband delay $\varphi_{BB}$ associated with the baseband signal processing circuit 110*a* in the RX channel RX1.

The radar device 100 may measure a baseband delay $\varphi_{BB}$ for the RX channel RX2 in a similar manner. For example, as illustrated in FIG. 6E, the radar device 100 may, during a second (later) time window, provide the reference signal $s_{REF}(t)$ at a first node in the baseband signal processing circuit 110*b* of the RX channel RX2 and at a second node in the RX channel RX1. In one example, the first node in the baseband signal processing circuit 110*b* of the RX channel RX2 is an input of a TIA and the second node of the RX channel RX1 is the ADC 112*a*. The radar device 100 can then determine the baseband delay $\varphi_{BB}$ associated with the baseband signal processing circuit 110*b* in the RX channel RX2 based on a difference between a phase of a digitized version of the reference signal $s_{REF}(t)$ (i.e., a digital baseband signal y[n]) at an output of the RX channel RX2 and a phase of a digitized reference signal $s_{REF}(t)$ at an output of the RX channel RX1. Notably, while FIGS. 6C-6E illustrate an example using a single pair of adjacent RX channels of a MMIC 116, this technique can be similarly applied for a MMIC 106 including more than two RX channels (e.g., four RX channels, five RX channels, eight RX channels, or the like). In such a case, two or more baseband delays $\varphi_{BB}$ associated with two or more respective baseband signal processing circuits 110 can be measured or determined concurrently. Further, a given pair of RX channels may in some implementations be non-adjacent on the MMIC 106. In general, RX channel pairs for baseband delay $\varphi_{BB}$ measurement may be chosen based on layout symmetry and load balance.

In some implementations, the radar device 100 may determine a phase response of a baseband signal processing circuit 110 based on the measured baseband delay $\varphi_{BB}$, and may correct a digitized output signal (e.g., a digital baseband signal y[n]) associated with a given RX channel based on the phase response, as described below.

In some implementations, the radar device 100 may determine a phase response of the baseband signal processing circuit 110 associated with a given RX channel based on the determined high pass corner frequency fen and the measured baseband delay $\varphi_{BB}$ and using a phase transfer function model associated with the baseband signal processing circuit 110. Notably, the phase response is substantially dominated by the phase response of the filter component 604 (e.g., the HPF, the AAF, or the like) and, therefore, the phase response of the filter component 604 is representative of the phase response of the baseband signal processing circuit 110. In some implementations, the corner frequency $f_{CH}$ and the baseband delay $\varphi_{BB}$ are inputs to a phase transfer function (i.e., a model) that represents the filter component 604. If the phase transfer function can be determined based on the parameters $f_{CH}$ and $\varphi_{BB}$, then the phase response of the filter component 604 (or of the filter stages therein) can be calculated. For example, the filter component 604 may comprise an HPF (e.g., a first-order HPF) and an AAF (e.g., comprising a sixth-order LPF, a PGA, a TIA, or the like). Here, a phase transfer function representing the filter component 604 may include a transfer function corresponding to the HPF (i.e., a sub-model representing the HPF) and a transfer function corresponding to the AAF (i.e., a sub-model representing the AAF). The transfer function representing the HPF can determined based on the frequency fen and the transfer function representing the AAF can be determined based on the baseband delay $\varphi_{BB}$. The phase response of the filter component 604 can therefore be determined using the phase transfer function model comprising the transfer function representing the HPF and the transfer function representing the AAF.

The transfer function representing the HPF of the baseband signal processing circuit 110 is denoted herein as $T_{HPF}(j\cdot\omega)$, while the transfer function representing the AAF of the baseband signal processing circuit 110 is denoted herein as $T_{AAF}(j\cdot\omega)$, where j represents the imaginary unit and $\omega=2\pi f$ represents an angular frequency. The product $T_{AAF}(j\cdot\omega)$. $T_{HPF}(j\cdot\omega)$ characterizes a series circuit comprising the HPF and the AAF in the baseband signal processing circuit 110. The transfer function $T_{AAF}(j\cdot\omega)$ can be assigned a phase response $F_{AAF}(\omega)$ (e.g., $F_{AAF}(\omega)=\arg\{T_{AAF}(j\cdot\omega)\}$) and the transfer function $T_{HPF}(j\cdot\omega)$ can be assigned a phase response $F_{HPF}(\omega)$ (e.g., $F_{HPF}(\omega)=\arg\{T_{HPF}(j\cdot\omega)\}$). These transfer functions model filter stages of the baseband signal processing circuit 110 for a nominal corner frequency $f_{nom}$ or a nominal baseband delay (nom. Phase responses $F_{AAF,k}(\omega)$ and $F_{HPF,k}(\omega)$ for a particular RX channel $RX_k$ can be determined from a corner frequency $f_{CH,k}$ and a baseband delay $\varphi_{BB,k}$ as follows, with the index k denoting the particular RX channel:

$$F_{HPF,k}(\omega) = F_{HPF}(\omega \cdot f_{CH,k} / f_{nom})$$

$$F_{AAF,k}(\omega) = F_{AAF}(\omega \cdot \varphi_{BB,k} / \varphi_{nom})$$

In this example, the overall phase response $F_k(\omega)$ for the RX channel $RX_k$ results in the sum of $F_{AAF,k}(\omega)$ and $F_{HPF,k}(\omega)$ (e.g., $F_k(\omega)=F_{HPF,k}(\omega)+F_{AAF,k}(\omega)$), which is the total phase distortion caused by the RX channel $RX_k$. A phase response for each RX channel of the radar device 100 can be determined in a similar manner. The phase responses of the individual RX channels may differ due to production-specific scattering or tolerances. During radar operation of the radar device 100, the phase responses can be used to compensate for the phase differences between the individual RX channels of the radar device 100. In some implementations, compensation can be performed by, for example, the DSP 114. In the conventional range-Doppler analysis, the phase responses specific to each RX channel of the radar device 100 can be taken into account following the first Fourier transformation in the frequency domain.

In some implementations, correction of the phase distortion caused by a channel $RX_k$ during operation of the radar device 100 can be performed as part of digital post-processing. The phase distortion $F_k(\omega)$ caused by an RX channel $RX_k$ corresponds to the following transfer function $H(j\cdot\omega)$:

$$H(j \cdot \omega) = \exp(j \cdot F_k(\omega)).$$

The transfer function $H(j\cdot\omega)$ can be assigned an inverse transfer function:

$$\overline{H}(j \cdot \omega) = \exp(-j \cdot F_k(\omega))$$

where $H(j\cdot\omega)\overline{H}(j\cdot\omega)=1$. Here, the 1" may be considered a reference transfer function. The analog output signal y(t) from the relevant RX channel $RX_k$ comprises a phase distortion which is caused by the baseband signal processing circuit 110 and can be described by the transfer function $H(j\cdot\omega)$. In the frequency domain, this phase distortion can be eliminated by multiplying by the inverse transfer function $\overline{H}(j\cdot\omega)$:

$$\overline{Y}(j \cdot \omega) = Y(j \cdot \omega) \cdot \overline{H}(j \cdot \omega) = Y(j \cdot \omega) \cdot \exp(-j \cdot F_k(\omega))$$

where $Y(j\cdot\omega)$ denotes the Fourier transform of analog output signal y(t) ($Y(j\cdot\omega)=F\{y(t)\}$, where the operator F denotes the Fourier transformation) and $\overline{Y}(j\cdot\omega)$ denotes the Fourier transform of the modified analog output signal $\overline{y}(t)$ in which the phase distortion of the analog frontend has been compensated. This process can be referred to as phase correction or phase equalizing, where $\exp(-j\cdot F_k(\omega))$ is the correction/equalizing function. Notably, multiplication by the transfer function $H(j\cdot\omega)$ used for the correction is a multiplication by a window function in the frequency domain. This means that phase correction can be implemented without any additional computing complexity in an implementation in which the transfer function $H(j\cdot\omega)$ used for the correction is calculated into a window function of the next transformation stage (also called Doppler fast Fourier transform (FFT)).

In some implementations, the phase correction is performed in the digital domain since, during normal operation of the radar device 100, a Fourier transformation will already be applied to the analog output signals y(t) from the individual RX channels. The above equation can be written as follows in the digital domain:

$$\overline{Y}[u] = Y[u] \cdot \overline{H}[u] = Y[u] \cdot \exp(-j \cdot F_k[u]),$$

where $$F_k[u] = F_k(u / T_s).$$

In the above equation, u denotes a digital frequency and $T_s$ denotes a sampling time interval. The discrete Fourier transform Y[u] of the digital baseband signal y[n] can be calculated, for example, using the FFT algorithm. Y[u] denotes the discrete Fourier transform of the modified analog output signal $\overline{y}(t)$. When using a windowed FFT, the phase correction can be taken into account in the window function, as noted above.

In operation, as part of a range-Doppler analysis, the radar device 100 may transform digital baseband signals $y_k[n]$ to the frequency domain in a first transformation stage (referred to as range FFT). In some implementations, the radar device 100 may perform phase correction (i.e., phase equalization) after this transformation. The modified signals $\overline{Y}[u]$ (in the frequency domain) are then supplied to a second transformation stage (referred to as Doppler FFT). The result is a two-dimensional array of complex numerical values, which is referred to as a range-Doppler map. Here, since the correction of the phase distortion is performed for all channels having the same model-based phase response $$F_k(\omega) = F_{HPF}(\omega \cdot f_{CH,k}/f_{nom}) + F_{AAF}(\omega \cdot \varphi_{BB,k}/\varphi_{nom}),$$

phase differences which are caused by the baseband signal processing circuits 110 between the individual digital baseband signals $y_k[n]$ are compensated for.

Notably, in the example described above, the radar device 100 scales the phase transfer function model associated with the baseband signal processing circuit 110 based on the high pass corner frequency $f_{CH}$ and the baseband delay $\varphi_{BB}$ to create a scaled phase transfer function model, and uses the scaled phase transfer function model in association with determining the phase response. However, in some implementations, the radar device 100 may be configured to compensate for the baseband delay $\varphi_{BB}$ without scaling the phase transfer function model based on the baseband delay $\varphi_{BB}$. For example, the radar device 100 may perform direct baseband delay compensation by subtracting the baseband delay $\varphi_{BB}$ from the output signal.

Figure 7:
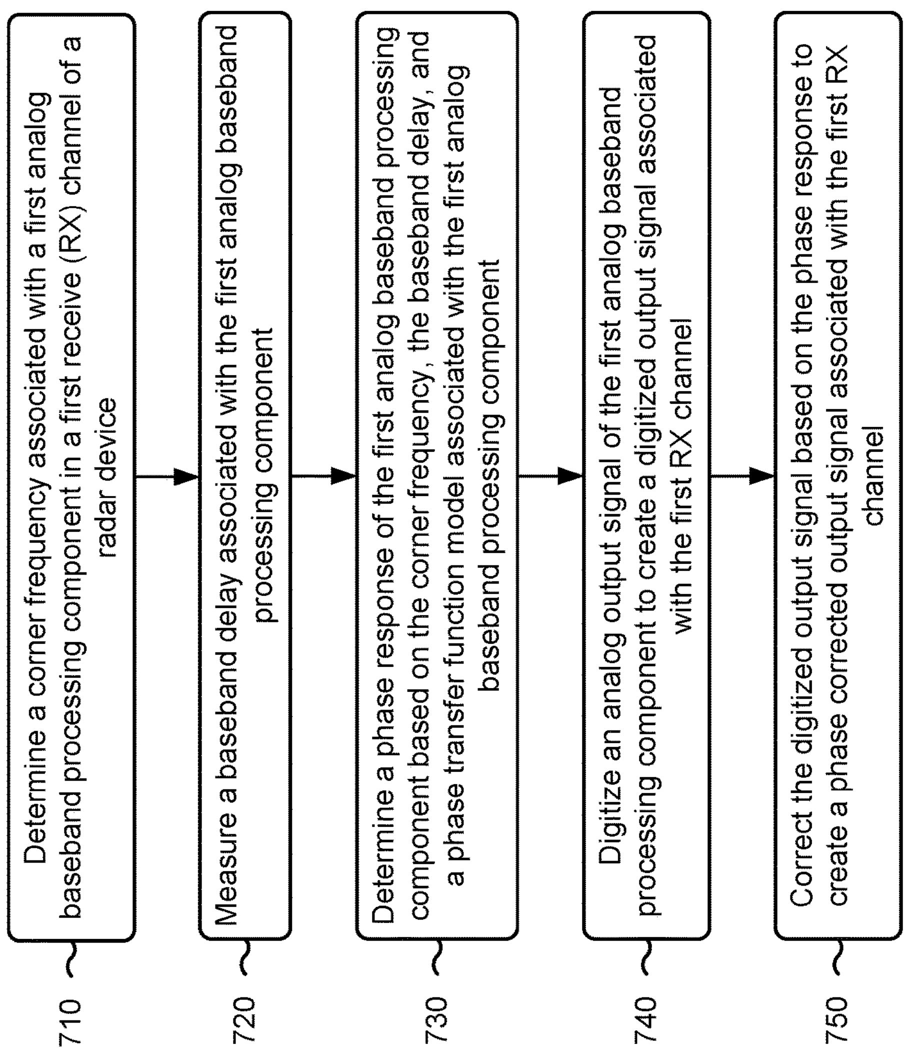
FIG. 7 is a flowchart of an example process associated with phase correction based on baseband delay.

FIG. 7 is a flowchart of an example process 700 associated with phase correction based on baseband delay. In some implementations, one or more process blocks of FIG. 7 are performed by a radar device (e.g., radar device 100) or one or more components of the radar device (e.g., the DSP 114, the controller 116, or the like).

As shown in FIG. 7, process 700 may include determining a corner frequency associated with a first analog baseband processing component in a first RX channel of a radar device (block 710). For example, the radar device may determine a corner frequency associated with a first analog baseband processing component (e.g., the baseband signal processing circuit 110) in a first RX channel of the radar device, as described above.

As further shown in FIG. 7, process 700 may include measuring a baseband delay associated with the first analog baseband processing component (block 720). For example, the radar device may measure a baseband delay associated with the first analog baseband processing component, as described above.

As further shown in FIG. 7, process 700 may include determining a phase response of the first analog baseband processing component based on the corner frequency, the baseband delay, and a phase transfer function model associated with the first analog baseband processing component (block 730). For example, the radar device may determine a phase response of the first analog baseband processing component based on the corner frequency, the baseband delay, and a phase transfer function model associated with the first analog baseband processing component, as described above.

As further shown in FIG. 7, process 700 may include digitizing an analog output signal of the first analog baseband processing component to create a digitized output signal associated with the first RX channel (block 740). For example, the radar device may digitize an analog output signal of the first analog baseband processing component to create a digitized output signal associated with the first RX channel, as described above.

As further shown in FIG. 7, process 700 may include correcting the digitized output signal based on the phase response to create a phase corrected output signal associated with the first RX channel (block 750). For example, the radar device may correct the digitized output signal based on the phase response to create a phase corrected output signal associated with the first RX channel, as described above.

Process 700 may include additional implementations, such as any single implementation or any combination of implementations described below and/or in connection with one or more other processes described elsewhere herein.

In a first implementation, determining the corner frequency comprises determining only a high pass corner frequency.

In a second implementation, alone or in combination with the first implementation, determining the phase response comprises scaling the phase transfer function model based on the baseband delay to create a scaled phase transfer function model, and determining the phase response based on the scaled phase transfer function model.

In a third implementation, alone or in combination with one or more of the first and second implementations, correcting the digitized output signal comprises compensating for the baseband delay without scaling the phase transfer function model based on the baseband delay.

In a fourth implementation, alone or in combination with one or more of the first through third implementations, determining the phase response comprises scaling the phase transfer function model based on the corner frequency to create a scaled phase transfer function model, and determining the phase response based on the scaled phase transfer function model.

In a fifth implementation, alone or in combination with one or more of the first through fourth implementations, measuring the baseband delay comprises providing, during a first time window, a reference signal at a first node in the first analog baseband processing component, providing, during the first time window, the reference signal at a second node in a second RX channel of the radar device, and determining the baseband delay based on a difference between a phase of the reference signal at an output of the first RX channel and a phase of the reference signal at an output of the second RX channel.

In a sixth implementation, alone or in combination with one or more of the first through fifth implementations, the first node is between a mixer of the first RX channel and the first analog baseband processing component and the second node is between a second analog baseband processing component in the second RX channel and an analog-to-digital converter.

In a seventh implementation, alone or in combination with one or more of the first through sixth implementations, the first RX channel and the second RX channel are implemented on a chip and the reference signal is generated by an on-chip signal source and is provided via an on-chip signal multiplexer implemented on the chip.

In an eighth implementation, alone or in combination with one or more of the first through seventh implementations, process 700 includes providing, during a second time window, the reference signal at a first node in the second analog baseband processing component, providing, during the second time window, the reference signal at a second node in the first RX channel, and determining a baseband delay associated with the second analog baseband processing component based on a difference between a phase of the reference signal at an output of the second RX channel and a phase of the reference signal at an output of the first RX channel.

In a ninth implementation, alone or in combination with one or more of the first through eighth implementations, process 700 includes determining a phase response of the second analog baseband processing component based on the baseband delay, and correcting a digitized output signal of the second analog baseband processing component based on the phase response of the second analog baseband processing component.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

Figure 8:
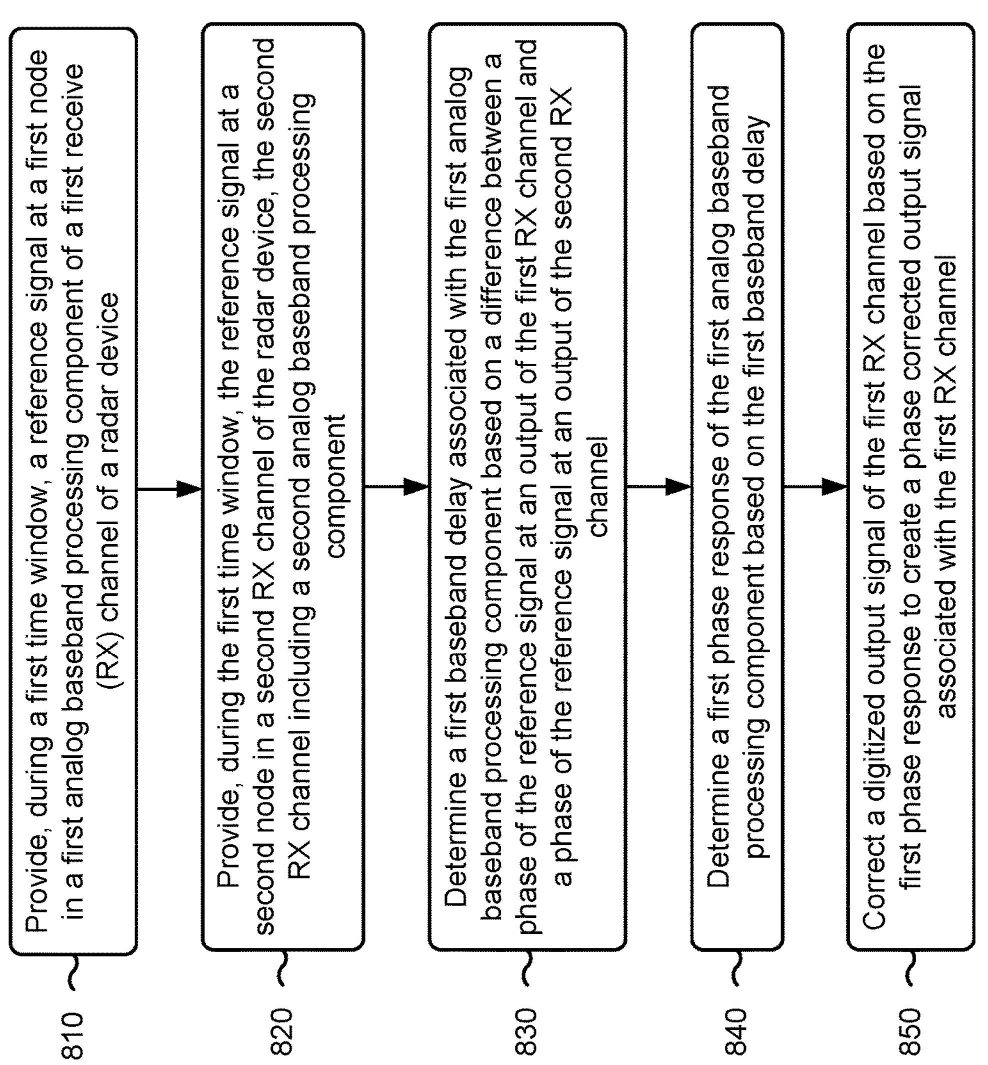
FIG. 8 is a flowchart of an example process associated with measuring a baseband delay.

FIG. 8 is a flowchart of an example process 800 associated with measuring a baseband delay. In some implementations, one or more process blocks of FIG. 8 are performed by a radar device (e.g., radar device 100) or one or more components of the radar device (e.g., the DSP 114, the controller 116, or the like).

As shown in FIG. 8, process 800 may include providing, during a first time window, a reference signal at a first node in a first analog baseband processing component of a first RX channel of a radar device (block 810). For example, the radar device may provide, during a first time window, a reference signal at a first node in a first analog baseband processing component (e.g., the baseband signal processing circuit 110) of a first RX channel of a radar device, as described above.

As further shown in FIG. 8, process 800 may include providing, during the first time window, the reference signal at a second node in a second RX channel of the radar device, the second RX channel including a second analog baseband processing component (block 820). For example, the radar device may provide, during the first time window, the reference signal at a second node in a second RX channel of the radar device, the second RX channel including a second analog baseband processing component, as described above.

As further shown in FIG. 8, process 800 may include determining a first baseband delay associated with the first analog baseband processing component based on a difference between a phase of the reference signal at an output of the first RX channel and a phase of the reference signal at an output of the second RX channel (block 830). For example, the radar device may determine a first baseband delay associated with the first analog baseband processing component based on a difference between a phase of the reference signal at an output of the first RX channel and a phase of the reference signal at an output of the second RX channel, as described above.

As further shown in FIG. 8, process 800 may include determining a first phase response of the first analog baseband processing component based on the first baseband delay (block 840). For example, the radar device may determine a first phase response of the first analog baseband processing component based on the first baseband delay, as described above.

As further shown in FIG. 8, process 800 may include correcting a digitized output signal of the first RX channel based on the first phase response to create a phase corrected output signal associated with the first RX channel (block 850). For example, the radar device may correct a digitized output signal of the first RX channel based on the first phase response to create a phase corrected output signal associated with the first RX channel, as described above.

Process 800 may include additional implementations, such as any single implementation or any combination of implementations described below and/or in connection with one or more other processes described elsewhere herein.

In a first implementation, determining the first phase response comprises scaling a phase transfer function model associated with the first analog baseband processing component based on the first baseband delay to create a scaled phase transfer function model, and determining the first phase response based on the scaled phase transfer function model.

In a second implementation, alone or in combination with the first implementation, process 800 includes providing, during a second time window, the reference signal at a first node in the second analog baseband processing component, providing, during the second time window, the reference signal at a second node in the first RX channel, determining a second baseband delay associated with the second analog baseband processing component based on a difference between a phase of the reference signal at an output of the second RX channel and a phase of the reference signal at an output of the first RX channel, determining a second phase response of the second analog baseband processing component based on the second baseband delay, and correcting a digitized output signal of the second RX channel based on the second phase response to create a phase corrected output signal associated with the first RX channel.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method, comprising: determining a corner frequency associated with a first analog baseband processing component in a first RX channel of a radar device; measuring a baseband delay associated with the first analog baseband processing component; determining a phase response of the first analog baseband processing component based on the corner frequency, the baseband delay, and a phase transfer function model associated with the first analog baseband processing component; digitizing an analog output signal of the first analog baseband processing component to create a digitized output signal associated with the first RX channel; and correcting the digitized output signal based on the phase response to create a phase corrected output signal associated with the first RX channel.

Aspect 2: The method of Aspect 1, wherein determining the corner frequency comprises determining only a high pass corner frequency.

Aspect 3: The method of any of Aspects 1-2, wherein determining the phase response comprises: scaling the phase transfer function model based on the baseband delay to create a scaled phase transfer function model; and determining the phase response based on the scaled phase transfer function model.

Aspect 4: The method of any of Aspects 1-2, wherein correcting the digitized output signal comprises compensating for the baseband delay without scaling the phase transfer function model based on the baseband delay.

Aspect 5: The method of any of Aspects 1-4, wherein determining the phase response comprises: scaling the phase transfer function model based on the corner frequency to create a scaled phase transfer function model; and determining the phase response based on the scaled phase transfer function model.

Aspect 6: The method of any of Aspects 1-5, wherein measuring the baseband delay comprises: providing, during a first time window, a reference signal at a first node in the first analog baseband processing component; providing, during the first time window, the reference signal at a second node in a second RX channel of the radar device; and determining the baseband delay based on a difference between a phase of the reference signal at an output of the first RX channel and a phase of the reference signal at an output of the second RX channel.

Aspect 7: The method of Aspect 6, wherein the first node is between a mixer of the first RX channel and the first analog baseband processing component and the second node is between a second analog baseband processing component in the second RX channel and an analog-to-digital converter.

Aspect 8: The method of any of Aspects 6-7, wherein the first RX channel and the second RX channel are implemented on a chip and the reference signal is generated by an on-chip signal source and is provided via an on-chip signal multiplexer implemented on the chip.

Aspect 9: The method of any of Aspects 6-8, further comprising: providing, during a second time window, the reference signal at a first node in the second analog baseband processing component; providing, during the second time window, the reference signal at a second node in the first RX channel; and determining a baseband delay associated with the second analog baseband processing component based on a difference between a phase of the reference signal at an output of the second RX channel and a phase of the reference signal at an output of the first RX channel.

Aspect 10: The method of Aspect 9, further comprising: determining a phase response of the second analog baseband processing component based on the baseband delay; and correcting a digitized output signal of the second analog baseband processing component based on the phase response of the second analog baseband processing component.

Aspect 11: A radar device, comprising: a first receive (RX) channel comprising a first analog baseband processing component; a second RX channel comprising a second analog baseband processing component; one or more components to: provide, during a first time window, a reference signal at a first node in the first analog baseband processing component; provide, during the first time window, the reference signal at a second node in the second RX channel; and determine a first baseband delay associated with the first analog baseband processing component based on a difference between a phase of the reference signal at an output of the first RX channel and a phase of the reference signal at an output of the second RX channel.

Aspect 12: The radar device of Aspect 11, wherein the one or more components are further configured to: determine a phase response of the first analog baseband processing component based on the first baseband delay; and correct a digitized output signal of the first RX channel based on the phase response to create a phase corrected output signal associated with the first RX channel.

Aspect 13: The radar device of Aspect 12, wherein the one or more components, to determine the phase response, are configured to: scale a phase transfer function model associated with the first analog baseband processing component based on the first baseband delay to create a scaled phase transfer function model; and determine the phase response based on the scaled phase transfer function model.

Aspect 14: The radar device of Aspect 12, wherein the digitized output signal is corrected based on the first baseband delay without scaling a phase transfer function model based on the first baseband delay.

Aspect 15: The radar device of any of Aspects 11-14, wherein the one or more components are further configured to: provide, during a second time window, the reference signal at a first node in the second analog baseband processing component; provide, during the second time window, the reference signal at a second node in the first RX channel; and determine a second baseband delay associated with the second analog baseband processing component based on a difference between a phase of the reference signal at an output of the second RX channel and a phase of the reference signal at an output of the first RX channel.

Aspect 16: The radar device of Aspect 15, wherein the one or more components are further configured to: determine a phase response of the second analog baseband processing component based on the second baseband delay; and correct a digitized output signal of the second RX channel based on the phase response to create a phase corrected output signal associated with the second RX channel.

Aspect 17: The radar device of any of Aspects 11-16, wherein the radar device is implemented on a chip and the reference signal is generated by an on-chip signal source and is provided via an on-chip signal multiplexer implemented on the chip.

Aspect 18: A method, comprising: providing, during a first time window, a reference signal at a first node in a first analog baseband processing component of a first receive (RX) channel of a radar device; providing, during the first time window, the reference signal at a second node in a second RX channel of the radar device, the second RX channel including a second analog baseband processing component; determining a first baseband delay associated with the first analog baseband processing component based on a difference between a phase of the reference signal at an output of the first RX channel and a phase of the reference signal at an output of the second RX channel; determining a first phase response of the first analog baseband processing component based on the first baseband delay; and correcting a digitized output signal of the first RX channel based on the first phase response to create a phase corrected output signal associated with the first RX channel.

Aspect 19: The method of Aspect 18, wherein determining the first phase response comprises: scaling a phase transfer function model associated with the first analog baseband processing component based on the first baseband delay to create a scaled phase transfer function model; and determining the first phase response based on the scaled phase transfer function model.

Aspect 20: The method of any of Aspects 18-19, further comprising: providing, during a second time window, the reference signal at a first node in the second analog baseband processing component; providing, during the second time window, the reference signal at a second node in the first RX channel; determining a second baseband delay associated with the second analog baseband processing component based on a difference between a phase of the reference signal at an output of the second RX channel and a phase of the reference signal at an output of the first RX channel; determining a second phase response of the second analog baseband processing component based on the second baseband delay; and correcting a digitized output signal of the second RX channel based on the second phase response to create a phase corrected output signal associated with the first RX channel.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a radar device, cause the radar device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, DSPs, general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

determining a corner frequency associated with a first analog baseband processing component in a first receive (RX) channel of a radar device;

measuring a baseband delay associated with the first analog baseband processing component;

determining a phase response of the first analog baseband processing component based on the corner frequency, the baseband delay, and a phase transfer function model associated with the first analog baseband processing component;

digitizing an analog output signal of the first analog baseband processing component to create a digitized output signal associated with the first RX channel; and correcting the digitized output signal based on the phase response to create a phase corrected output signal associated with the first RX channel.

2. The method of claim 1, wherein determining the corner frequency comprises determining only a high pass corner frequency.

3. The method of claim 1, wherein determining the phase response comprises:

scaling the phase transfer function model based on the baseband delay to create a scaled phase transfer function model; and determining the phase response based on the scaled phase transfer function model.

4. The method of claim 1, wherein correcting the digitized output signal comprises compensating for the baseband delay without scaling the phase transfer function model based on the baseband delay.

5. The method of claim 1, wherein determining the phase response comprises:

scaling the phase transfer function model based on the corner frequency to create a scaled phase transfer function model; and determining the phase response based on the scaled phase transfer function model.

6. The method of claim 1, wherein measuring the baseband delay comprises:

providing, during a first time window, a reference signal at a first node in the first analog baseband processing component;

providing, during the first time window, the reference signal at a second node in a second RX channel of the radar device; and determining the baseband delay based on a difference between a phase of the reference signal at an output of the first RX channel and a phase of the reference signal at an output of the second RX channel.

7. The method of claim 6, wherein the first node is between a mixer of the first RX channel and the first analog baseband processing component and the second node is between a second analog baseband processing component in the second RX channel and an analog-to-digital converter.

8. The method of claim 6, wherein the first RX channel and the second RX channel are implemented on a chip and the reference signal is generated by an on-chip signal source and is provided via an on-chip signal multiplexer implemented on the chip.

9. The method of claim 6, further comprising:

providing, during a second time window, the reference signal at a first node in a second analog baseband processing component in the second RX channel;

providing, during the second time window, the reference signal at a second node in the first RX channel; and determining a baseband delay associated with the second analog baseband processing component based on a difference between a phase of the reference signal at an output of the second RX channel and a phase of the reference signal at an output of the first RX channel.

10. The method of claim 9, further comprising:

determining a phase response of the second analog baseband processing component based on the baseband delay; and correcting a digitized output signal of the second analog baseband processing component based on the phase response of the second analog baseband processing component.

11. A radar device, comprising:

a first receive (RX) channel comprising a first analog baseband processing component;

a second RX channel comprising a second analog baseband processing component;

one or more components to:

provide, during a first time window, a reference signal at a first node in the first analog baseband processing component;

provide, during the first time window, the reference signal at a second node in the second RX channel; and determine a first baseband delay associated with the first analog baseband processing component based on a difference between a phase of the reference signal at an output of the first RX channel and a phase of the reference signal at an output of the second RX channel.

12. The radar device of claim 11, wherein the one or more components are further configured to:

determine a phase response of the first analog baseband processing component based on the first baseband delay; and correct a digitized output signal of the first RX channel based on the phase response to create a phase corrected output signal associated with the first RX channel.

13. The radar device of claim 12, wherein the one or more components, to determine the phase response, are configured to:

scale a phase transfer function model associated with the first analog baseband processing component based on the first baseband delay to create a scaled phase transfer function model; and determine the phase response based on the scaled phase transfer function model.

14. The radar device of claim 12, wherein the digitized output signal is corrected based on the first baseband delay without scaling a phase transfer function model based on the first baseband delay.

15. The radar device of claim 11, wherein the one or more components are further configured to:

provide, during a second time window, the reference signal at a first node in the second analog baseband processing component;

provide, during the second time window, the reference signal at a second node in the first RX channel; and determine a second baseband delay associated with the second analog baseband processing component based on a difference between a phase of the reference signal at an output of the second RX channel and a phase of the reference signal at an output of the first RX channel.

16. The radar device of claim 15, wherein the one or more components are further configured to:

determine a phase response of the second analog baseband processing component based on the second baseband delay; and correct a digitized output signal of the second RX channel based on the phase response to create a phase corrected output signal associated with the second RX channel.

17. The radar device of claim 11, wherein the radar device is implemented on a chip and the reference signal is generated by an on-chip signal source and is provided via an on-chip signal multiplexer implemented on the chip.

18. A method, comprising:

providing, during a first time window, a reference signal at a first node in a first analog baseband processing component of a first receive (RX) channel of a radar device;

providing, during the first time window, the reference signal at a second node in a second RX channel of the radar device, the second RX channel including a second analog baseband processing component;

determining a first baseband delay associated with the first analog baseband processing component based on a difference between a phase of the reference signal at an output of the first RX channel and a phase of the reference signal at an output of the second RX channel;

determining a first phase response of the first analog baseband processing component based on the first baseband delay; and correcting a digitized output signal of the first RX channel based on the first phase response to create a phase corrected output signal associated with the first RX channel.

19. The method of claim 18, wherein determining the first phase response comprises:

scaling a phase transfer function model associated with the first analog baseband processing component based on the first baseband delay to create a scaled phase transfer function model; and determining the first phase response based on the scaled phase transfer function model.

20. The method of claim 18, further comprising:

providing, during a second time window, the reference signal at a first node in the second analog baseband processing component;

providing, during the second time window, the reference signal at a second node in the first RX channel;

determining a second baseband delay associated with the second analog baseband processing component based on a difference between a phase of the reference signal at an output of the second RX channel and a phase of the reference signal at an output of the first RX channel;

determining a second phase response of the second analog baseband processing component based on the second baseband delay; and correcting a digitized output signal of the second RX channel based on the second phase response to create a phase corrected output signal associated with the first RX channel.

* * * * *